United States Patent
Liao et al.

(10) Patent No.: US 11,507,725 B2
(45) Date of Patent: Nov. 22, 2022

(54) INTEGRATED CIRCUIT LAYOUTS WITH LINE-END EXTENSIONS

(71) Applicant: Taiwan Semiconductor Manufacturing Co., Ltd., Hsinchu (TW)

(72) Inventors: Hsien-Huang Liao, Hsinchu (TW); Tung-Heng Hsieh, Hsinchu County (TW); Bao-Ru Young, Hsinchu County (TW); Yung Feng Chang, Hsinchu (TW)

(73) Assignee: TAIWAN SEMICONDUCTOR MANUFACTURING CO., LTD., Hsinchu (TW)

(*) Notice: Subject to any disclaimer, the term of this patent is extended or adjusted under 35 U.S.C. 154(b) by 0 days.

(21) Appl. No.: 17/195,136

(22) Filed: Mar. 8, 2021

(65) Prior Publication Data

US 2021/0192121 A1 Jun. 24, 2021

Related U.S. Application Data

(60) Continuation of application No. 16/686,448, filed on Nov. 18, 2019, now Pat. No. 10,943,054, which is a
(Continued)

(51) Int. Cl.
*G06F 30/398* (2020.01)
*G06F 30/39* (2020.01)
(Continued)

(52) U.S. Cl.
CPC .............. *G06F 30/398* (2020.01); *G03F 1/36* (2013.01); *G06F 30/367* (2020.01); *G06F 30/39* (2020.01); *G06F 2119/06* (2020.01)

(58) Field of Classification Search
CPC ...... G06F 30/398; G06F 30/367; G06F 30/39; G06F 2119/06; G03F 1/36;
(Continued)

(56) References Cited

U.S. PATENT DOCUMENTS

| 8,418,111 B2 | 4/2013 | Chen et al. |
| 8,533,651 B1 | 9/2013 | Tan et al. |
(Continued)

FOREIGN PATENT DOCUMENTS

| CN | 106356333 | 1/2017 |
| CN | 106571308 | 4/2019 |
(Continued)

*Primary Examiner* — Nha T Nguyen
(74) *Attorney, Agent, or Firm* — Haynes and Boone, LLP

(57) ABSTRACT

Various examples of integrated circuit layouts with line-end extensions are disclosed herein. In an example, a method includes receiving an integrated circuit layout that contains: a first and second set of shapes extending in parallel in a first direction, wherein a pitch of the first set of shapes is different from a pitch of the second set of shapes. A cross-member shape is inserted into the integrated circuit layout that extends in a second direction perpendicular to the first direction, and a set of line-end extensions is inserted into the integrated circuit layout that extend from each shape of the first set of shapes and the second set of shapes to the cross-member shape. The integrated circuit layout containing the first set of shapes, the second set of shapes, the cross-member shape, and the set of line-end extensions is provided for fabricating an integrated circuit.

20 Claims, 32 Drawing Sheets

Related U.S. Application Data division of application No. 15/689,472, filed on Aug. 29, 2017, now Pat. No. 10,803,227.

(51) Int. Cl.
  *G06F 30/367* (2020.01)
  *G03F 1/36* (2012.01)
  *G06F 119/06* (2020.01)

(58) Field of Classification Search
  CPC ............ G03F 7/70433; G03F 7/70441; H01L 21/0337; H01L 21/3086; H01L 21/823431; H01L 27/0611; H01L 21/0273
  See application file for complete search history.

(56) References Cited

U.S. PATENT DOCUMENTS

| | | | |
|---|---|---|---|
| 8,621,406 B2 | 12/2013 | Lei et al. | |
| 8,675,397 B2 * | 3/2014 | Liaw | H01L 27/0207 |
| | | | 365/49.1 |
| 8,728,332 B2 | 5/2014 | Lin et al. | |
| 8,796,666 B1 | 8/2014 | Huang et al. | |
| 8,806,397 B2 | 8/2014 | Wang et al. | |
| 8,822,243 B2 | 9/2014 | Yan et al. | |
| 8,878,309 B1 | 11/2014 | Hong et al. | |
| 8,918,746 B1 | 12/2014 | Yuan et al. | |
| 8,987,142 B2 | 3/2015 | Lee et al. | |
| 9,093,530 B2 | 4/2015 | Huang et al. | |
| 9,053,279 B2 | 6/2015 | Chang et al. | |
| 9,099,530 B2 | 8/2015 | Lin et al. | |
| 9,153,478 B2 | 10/2015 | Liu et al. | |
| 9,379,106 B2 | 6/2016 | Hong et al. | |
| 9,501,601 B2 | 11/2016 | Chang et al. | |
| 9,548,303 B2 | 1/2017 | Lee et al. | |
| 9,583,600 B1 | 2/2017 | Lin | |
| 10,192,021 B1 | 1/2019 | Raj et al. | |
| 10,211,225 B2 | 2/2019 | Leobandung et al. | |
| 10,324,369 B2 | 6/2019 | Wang et al. | |
| 10,803,227 B2 | 10/2020 | Liao et al. | |
| 2008/0308880 A1 | 12/2008 | Inaba | |
| 2012/0124528 A1 | 5/2012 | Wang et al. | |
| 2012/0139101 A1* | 6/2012 | Shimada | H01L 21/76819 |
| | | | 257/734 |
| 2013/0174112 A1* | 7/2013 | Ho | G03F 1/70 |
| | | | 716/122 |
| 2013/0187237 A1* | 7/2013 | Yu | H01L 29/161 |
| | | | 438/222 |
| 2013/0309838 A1* | 11/2013 | Wei | H01L 29/6681 |
| | | | 257/E21.546 |
| 2013/0334610 A1* | 12/2013 | Moroz | H01L 23/528 |
| | | | 257/E21.632 |
| 2014/0013288 A1 | 1/2014 | Wang et al. | |
| 2014/0331193 A1 | 11/2014 | Wang et al. | |
| 2014/0346662 A1* | 11/2014 | Rashed | H01L 29/785 |
| | | | 438/618 |
| 2015/0115373 A1 | 4/2015 | Yu et al. | |
| 2016/0056181 A1* | 2/2016 | Anderson | H01L 21/823481 |
| | | | 438/157 |
| 2016/0163584 A1 | 6/2016 | Yuan et al. | |
| 2016/0293748 A1 | 10/2016 | Leobandung et al. | |
| 2016/0351411 A1* | 12/2016 | Xie | H01L 21/823431 |
| 2016/0378906 A1 | 12/2016 | Yuan et al. | |
| 2017/0017745 A1 | 1/2017 | Wang et al. | |
| 2017/0207126 A1 | 7/2017 | Ching et al. | |
| 2017/0271503 A1* | 9/2017 | Yu | H01L 29/66795 |
| 2018/0018420 A1 | 1/2018 | Cline et al. | |
| 2018/0341736 A1 | 11/2018 | Chen et al. | |
| 2019/0065654 A1 | 2/2019 | Liao et al. | |
| 2020/0082055 A1 | 3/2020 | Liao et al. | |

FOREIGN PATENT DOCUMENTS

| | | |
|---|---|---|
| DE | 102012205914 | 4/2013 |
| TW | 201230208 | 7/2012 |
| TW | 201236086 | 9/2012 |
| TW | 201539543 | 10/2015 |

* cited by examiner

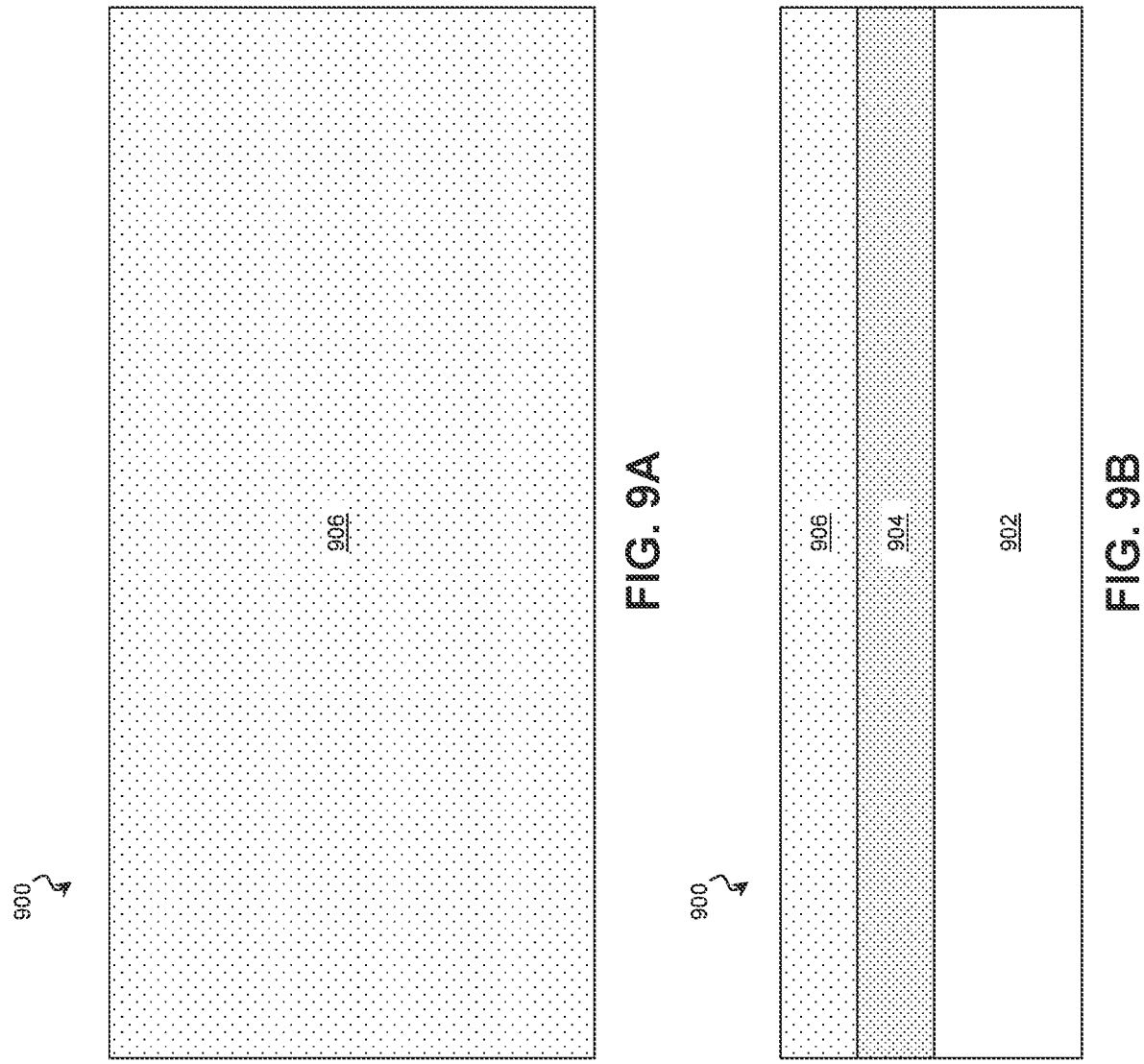

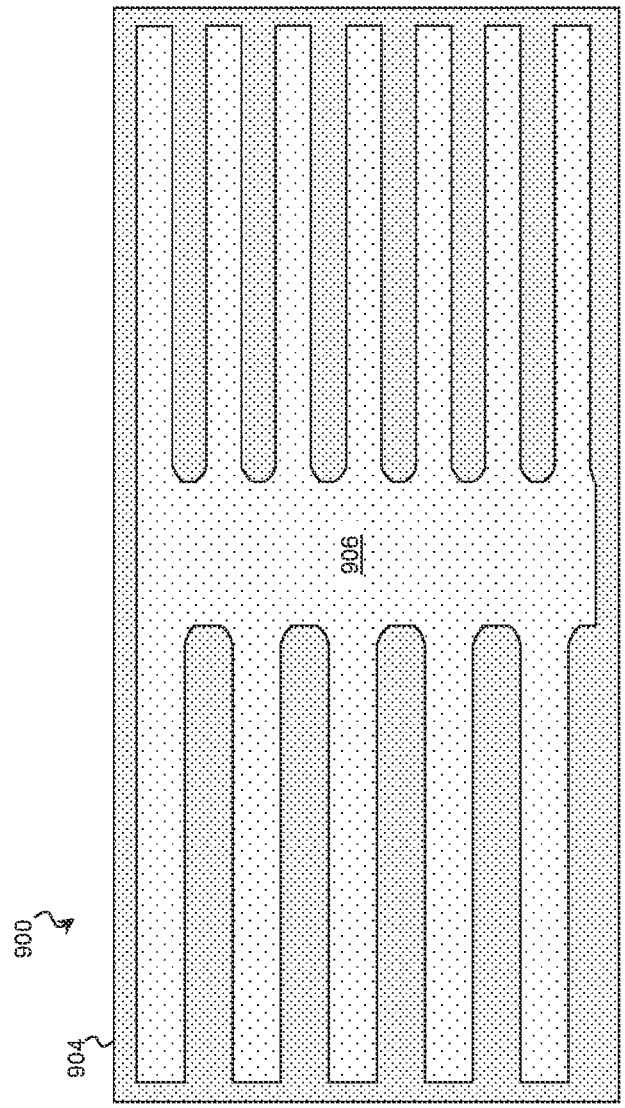
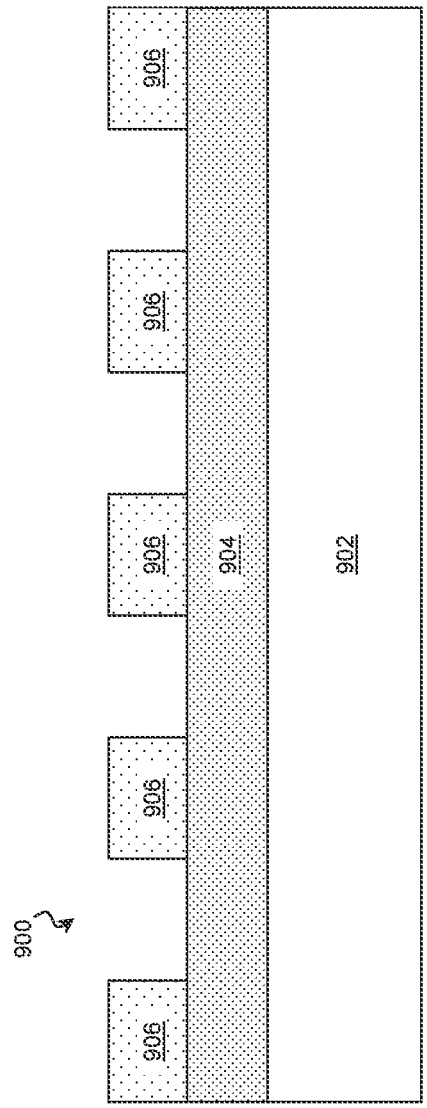
FIG. 10A
FIG. 10B

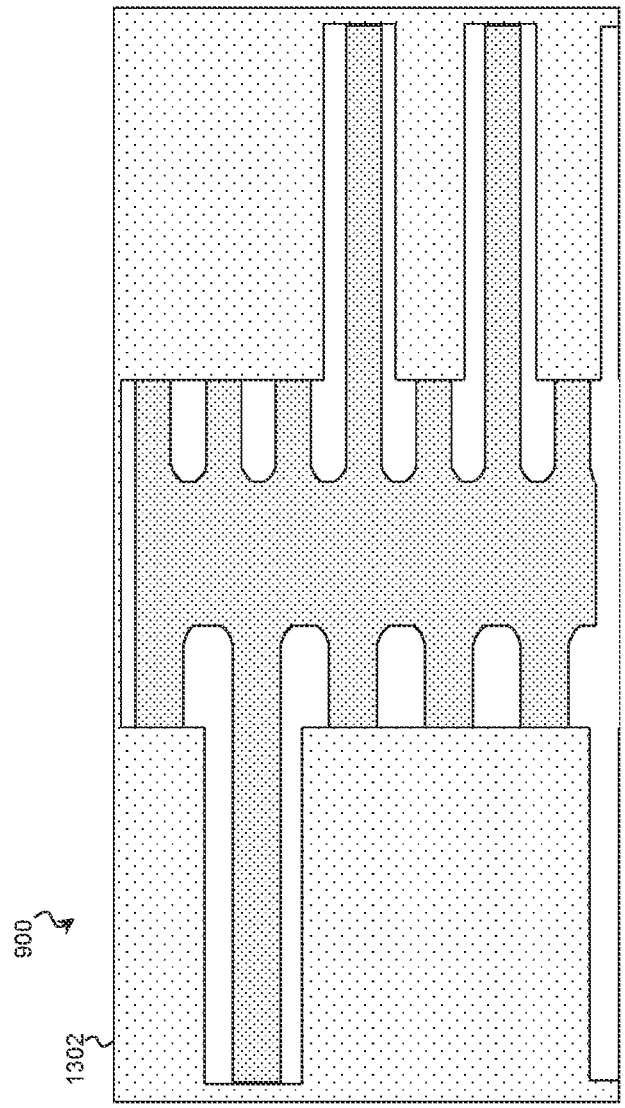
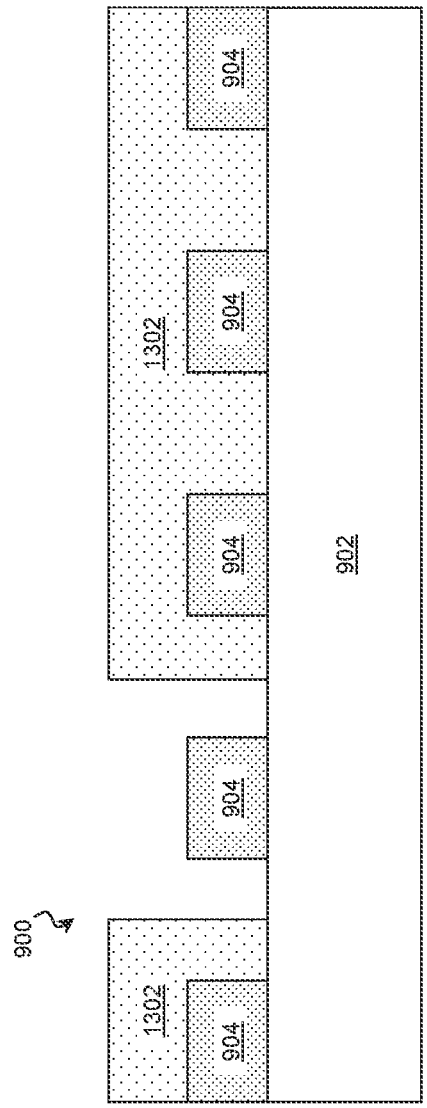
FIG. 13A
FIG. 13B

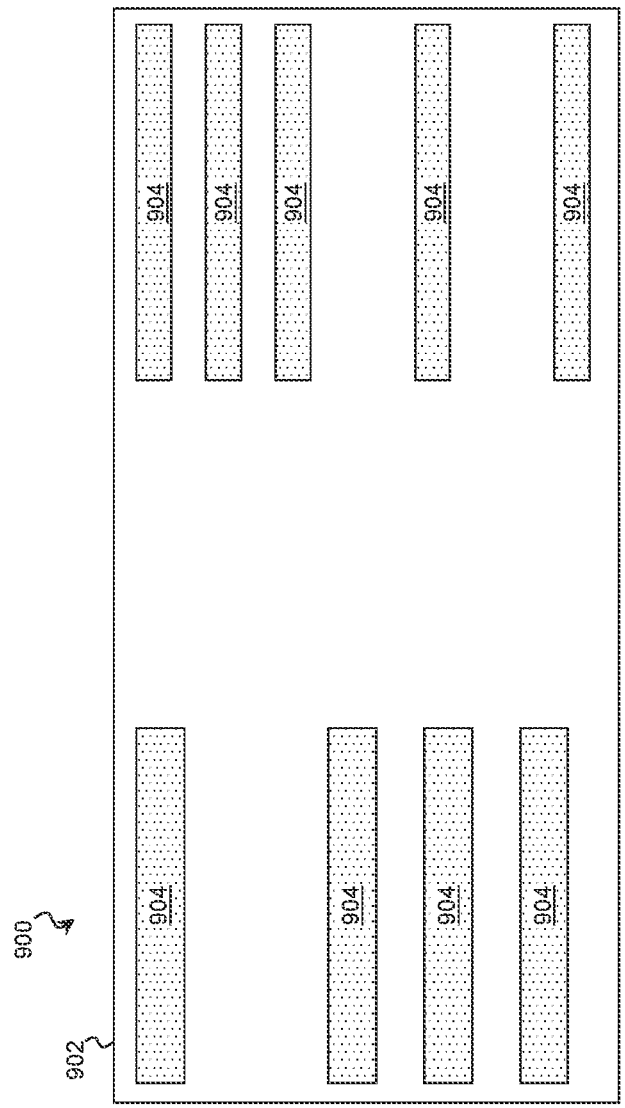
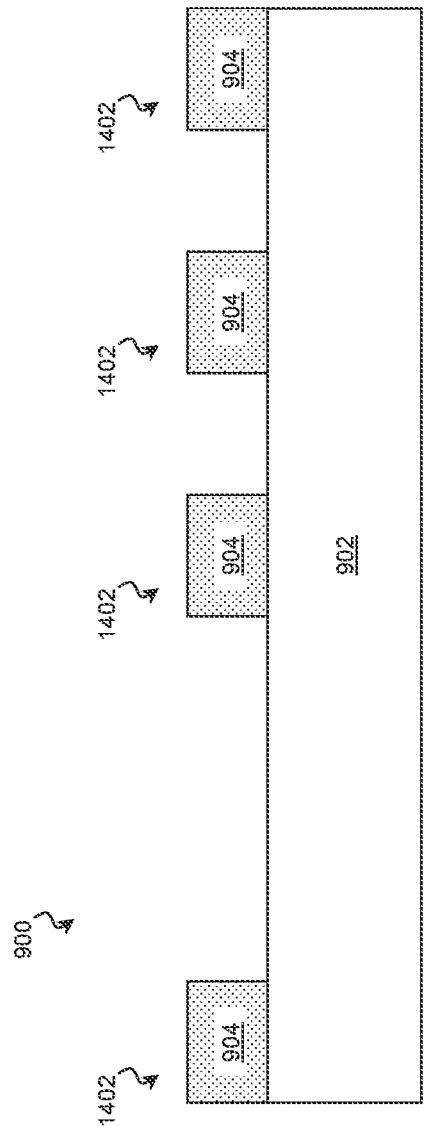
FIG. 14A
FIG. 14B

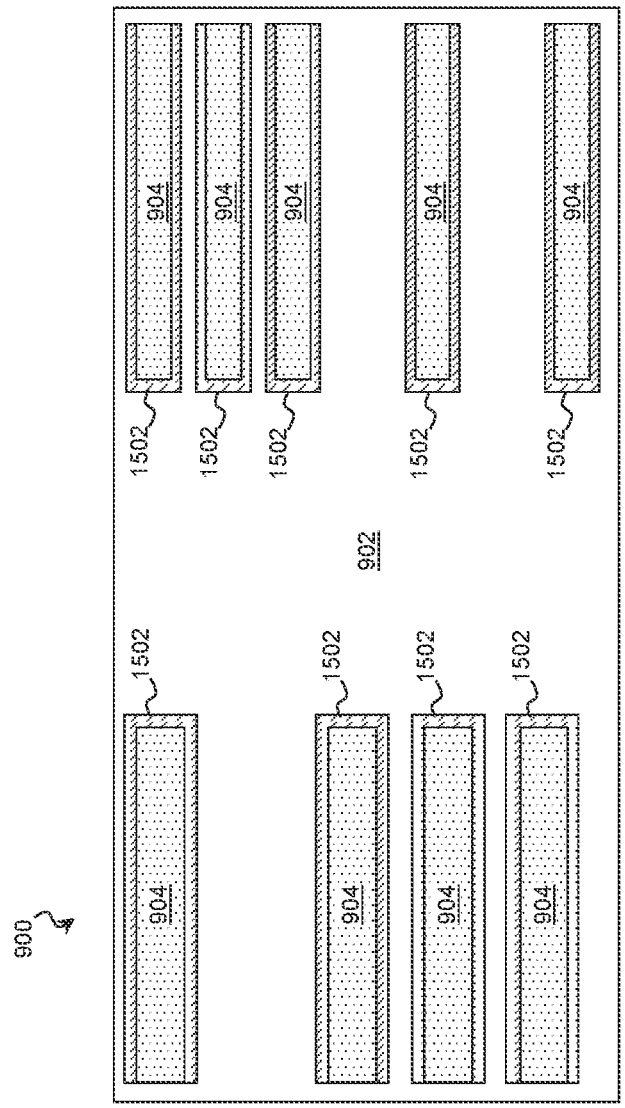
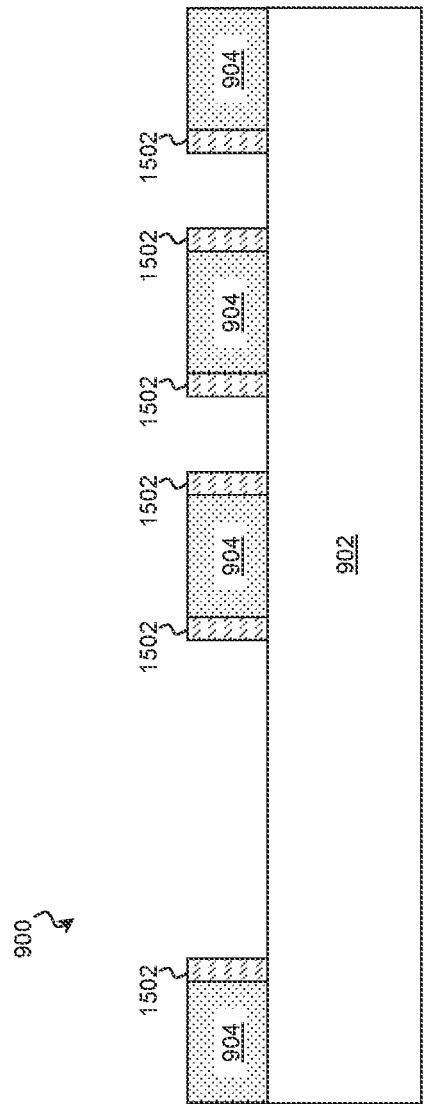
FIG. 16A
FIG. 16B

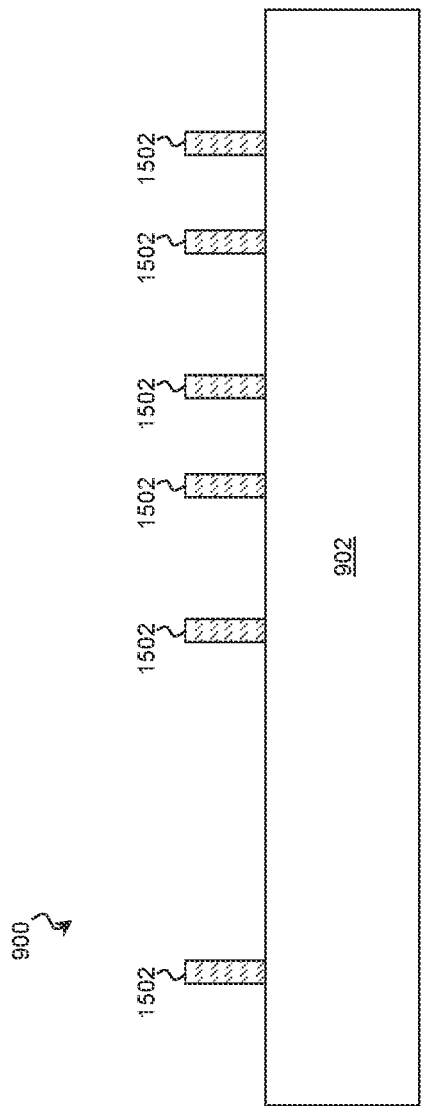
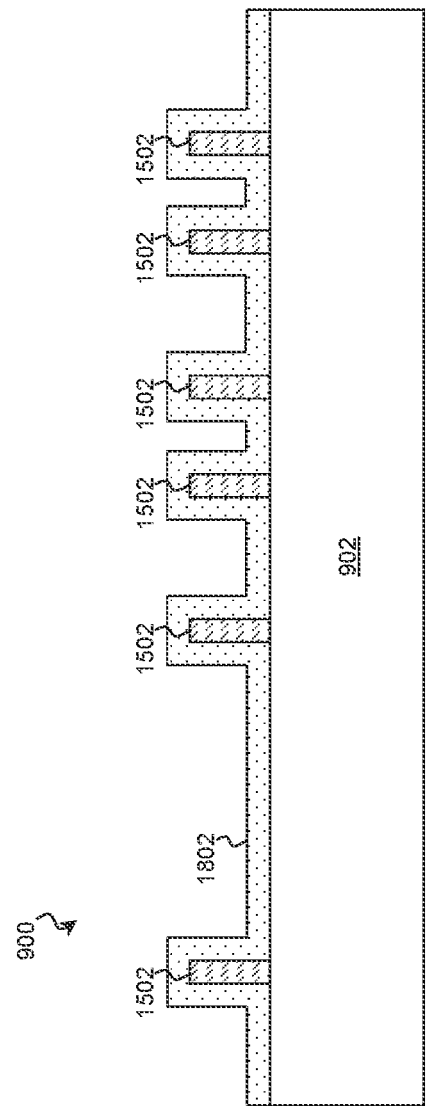

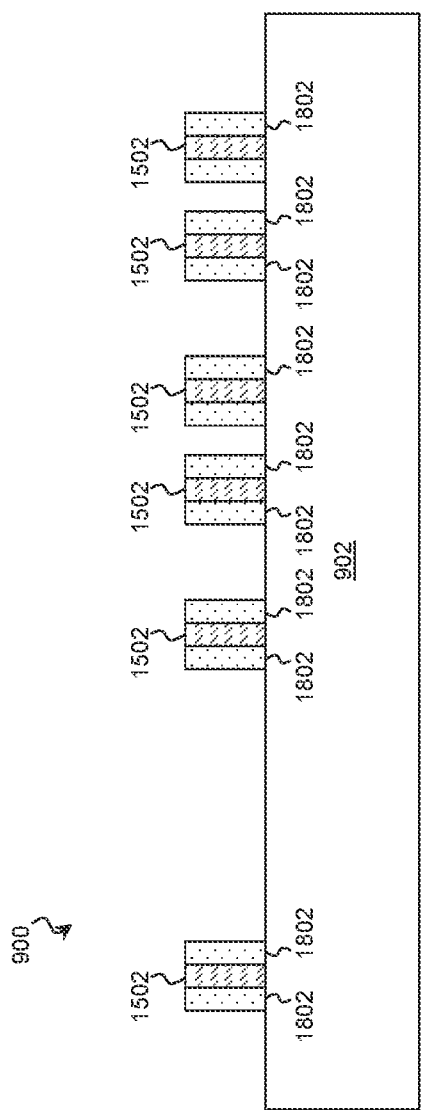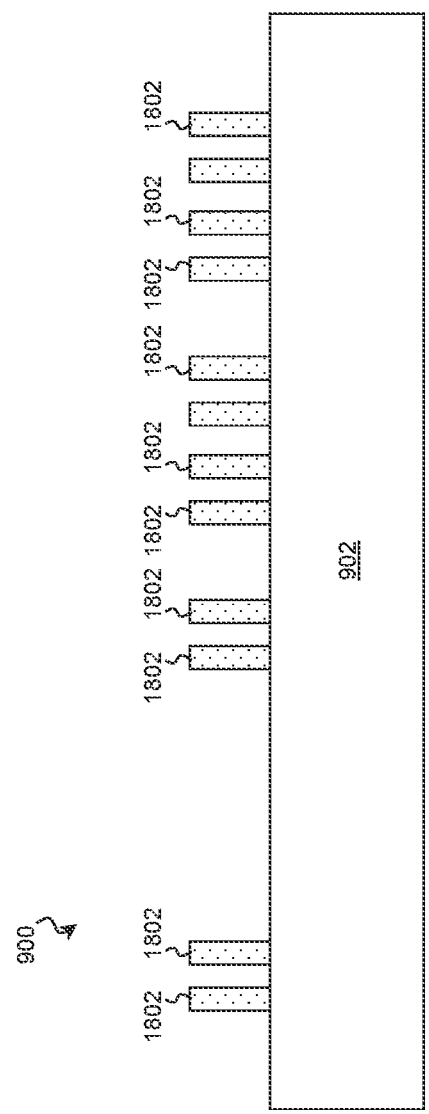

INTEGRATED CIRCUIT LAYOUTS WITH LINE-END EXTENSIONS

PRIORITY DATA

The present application is a continuation application of U.S. application Ser. No. 16/686,448, filed Nov. 18, 2019, which is a divisional application of U.S. application Ser. No. 15/689,472, filed Aug. 29, 2017, each of which is incorporated herein by reference in its entirety.

BACKGROUND

The semiconductor Integrated Circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. However, such scaling down has also been accompanied by increased complexity in design and manufacturing of devices incorporating these ICs. Parallel advances in manufacturing have allowed increasingly complex designs to be fabricated with precision and reliability.

For example, some advances compensate for optical effects and processing imperfections that occur near the limits of lithography. In many examples, ICs features are defined and formed on a semiconductor substrate using a set of photolithographic masks. The masks have patterns formed by transmissive or reflective regions. During a photolithographic exposure, radiation such as ultraviolet light passes through or reflects off the mask before striking a photoresist coating on the substrate. The mask transfers the pattern onto the photoresist, which is then selectively removed to reveal the pattern. The substrate then undergoes processing steps that take advantage of the shape of the remaining photoresist to create circuit features on the substrate. When the processing steps are complete, another photoresist is applied and substrate is exposed using the next mask. In this way, the features are layered to produce the final circuit.

The nature of light causes the patterns formed on the substrate to vary from the pattern of the mask. Behaviors of light such as diffraction, fringing, and interference behaviors cause variances such as corner rounding and edge errors. Likewise, processing variations such as etching imperfections and pattern collapse may cause further variances, particularly at corners and feature edges.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 9A, 10A, and 11A are top views of a portion of a workpiece corresponding to the layout according to various aspects of the present disclosure.

FIGS. 9B, 10B, 11B, 13B, 14B, 15B, 16B, and 17-22 are cross-sectional views of a portion of the workpiece corresponding to the layout according to various aspects of the present disclosure.

FIGS. 13A, 14A, 15A, and 16A are top views of a portion of the workpiece corresponding to the layout according to various aspects of the present disclosure.

FIGS. 13B, 14B, 15B, 16B, and 17-22 are cross-sectional views of a portion of the workpiece corresponding to the layout according to various aspects of the present disclosure.

DETAILED DESCRIPTION

Figure 1A:
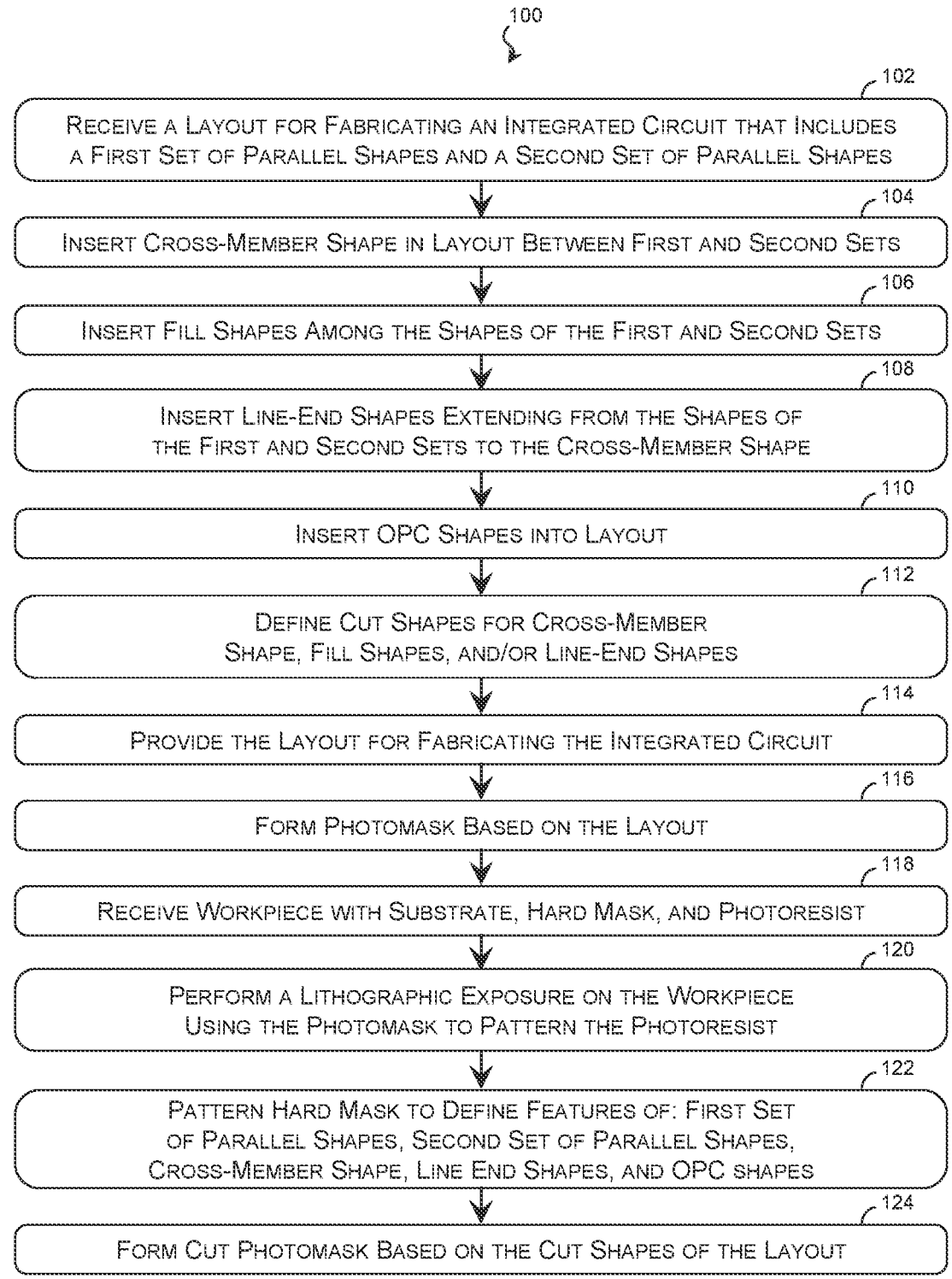
FIGS. 1A and 1B are flow diagrams of a method of fabricating an integrated circuit according to various aspects of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations beyond the extent noted.

Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

As feature sizes shrink, differences between design shapes and the patterns formed on a substrate impart a larger effect on device performance. In an example of a simple line, optical effects during lithography may tend to round the line ends rather than produce a crisp corner. Furthermore, etching and other processing steps may also round the end of the line as this portion is exposed to the etchant or other processing reactant from multiple sides. Of course, these are only some examples of feature discrepancies that occur in integrated circuit formation. Other thickness variations, placement variations, and irregularities may occur alone or in combination. The impact of these variations may be exacerbated as the size of a feature shrinks because the variations remain the same or become larger, and thus the imperfection grows relative to the feature.

As described below, the present disclosure provides a technique for forming features with improved regularity, particularly at the end of feature lines. In some examples, the technique modifies a region of a layout that includes a first set of parallel lines, a second set of parallel lines, and a gap therebetween. The sets of parallel lines may have different width, pitch, and/or spacing. While line-end imperfections may be compensated for by adding sacrificial line-end extensions in the gap such that the rounding is contained within the line-end extensions, it has been determined that, for smaller feature sizes, the line-end rounding becomes more pronounced and more irregular. This may make it difficult to contain the rounding within the line-end extensions without significantly growing the extensions and the gap.

Accordingly, in order to control line-end rounding even while reducing gap size, in some examples, the layout is modified to include line-end extensions that join the first set of parallel lines with the second set of parallel lines. Because the extensions join the lines, some line ends may be avoided entirely while others may merely experience a change in thickness, which may produce less dramatic rounding effects. In some examples, the layout is modified to include a cross-member shape in the gap that runs perpendicular to the first and second sets of parallel lines. The line-end extensions may connect the lines of the first and second sets of parallel lines to the cross-member shape. Because the extensions connect to the cross-member shape rather than terminating, line ends and the associated fabrication issues are avoided.

In some examples, filler shapes are added to the layout that run parallel to the first and second set of lines, and the filler shapes may be disposed among these lines to improve the integrity of the lines. The layout with the line-end extensions, cross-member shapes, and/or filler shapes may undergo other Optical Proximity Correction (OPC) processes to add, remove, or otherwise adjust the features and their boundaries. Afterwards, the layout may be used in a fabrication process.

In some examples, the line-end extensions are included in filler cells that are added to the layout. A variety of filler cells may be defined, each configured to align to a particular grid or set of grids. In this way, specific filler cells may exist for off-grid regions where the local grids do not conform to the global grid of the layout.

In some examples, some of the features formed by the line-end extensions, cross-member shapes, and/or filler shapes remain in the final workpiece to improve feature density in otherwise low-density regions. These features may physically reinforce the otherwise low-density regions to reduce bumps, dishing, and other irregularities during fabrication.

In some such examples, the layout is used to create a lithographic mask. In turn, the lithographic mask is used in a lithographic process to define features on a substrate. The features may be formed in any suitable material and used for any suitable fabrication purpose. The line-end extensions, cross-member shapes, and/or filler shapes enhance the integrity of the first and second set of lines, particularly, but not limited to, at the line ends. The improved uniformity and precision may allow the gap between the first and second sets to be reduced and may enhance circuit performance and reliability. Thus, some embodiments of the present disclosure thereby provide greater feature integrity with reduced line-end rounding. However, unless otherwise noted, no embodiment is required to provide any particular advantage.

Figure 1B:
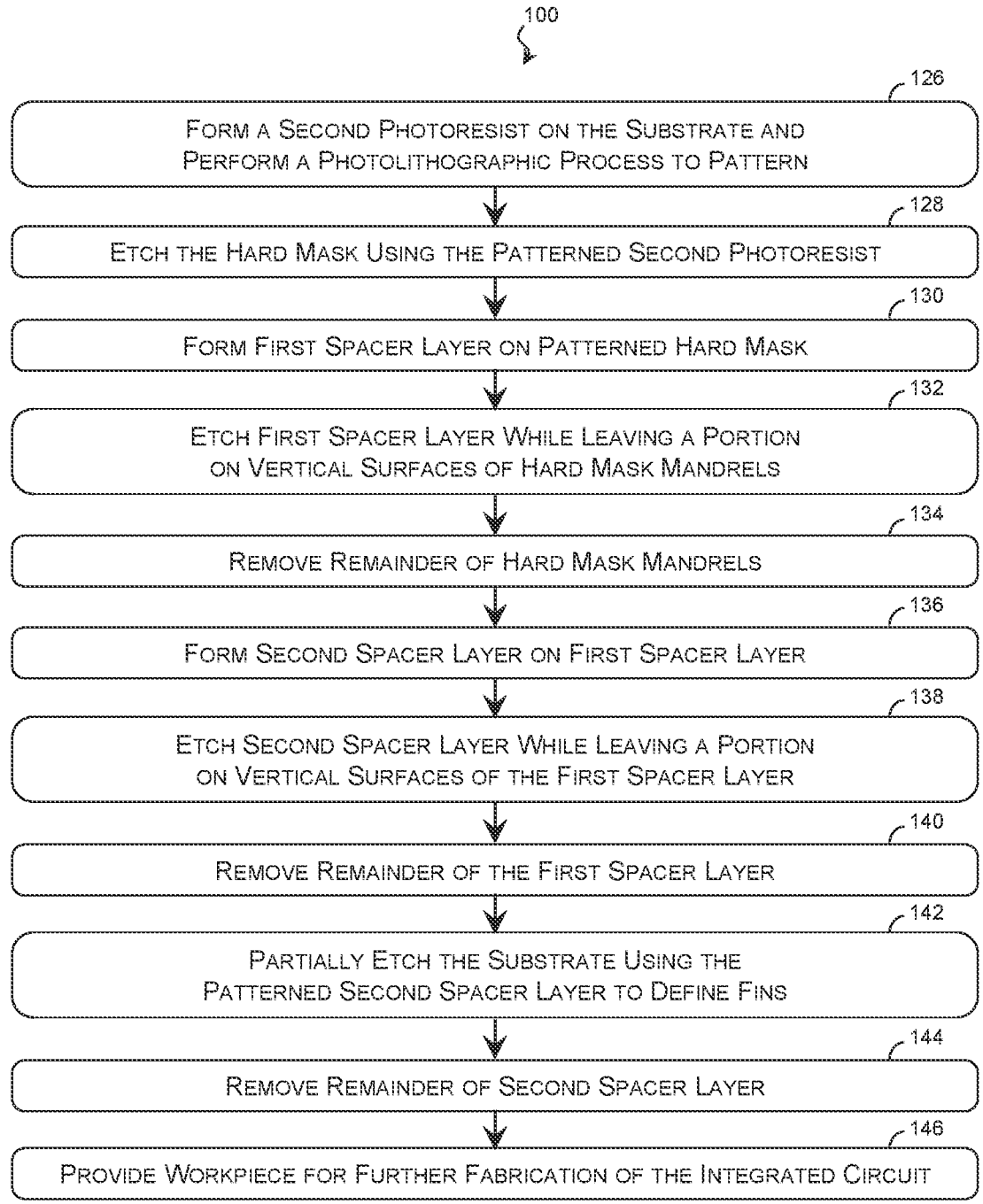

A technique for fabricating an integrated circuit is described with reference to FIGS. 1A, 1B, and 2-22. In that regard, FIGS. 1A and 1B are flow diagrams of a method 100 of fabricating an integrated circuit according to various aspects of the present disclosure. Additional steps can be provided before, during, and after the method 100, and some of the steps described can be replaced or eliminated for other embodiments of the method 100. FIGS. 2-7 are diagrams of a portion of a layout 200 for fabricating an integrated circuit undergoing the method 100 according to various aspects of the present disclosure. FIG. 8 is a top view diagram of a photomask 800 manufactured according to the layout 200 according to various aspects of the present disclosure. FIGS. 9A, 10A, 11A, 13A, 14A, 15A, and 16A are top views of a portion of a workpiece 900 corresponding to the layout 200 according to various aspects of the present disclosure. FIGS. 9B, 10B, 11B, 13B, 14B, 15B, 16B, and 17-22 are cross-sectional views of a portion of the workpiece 900 corresponding to the layout 200 according to various aspects of the present disclosure. FIG. 12 is a top view diagram of a cut photomask 1200 manufactured according to the layout 200 according to various aspects of the present disclosure.

Figure 2:
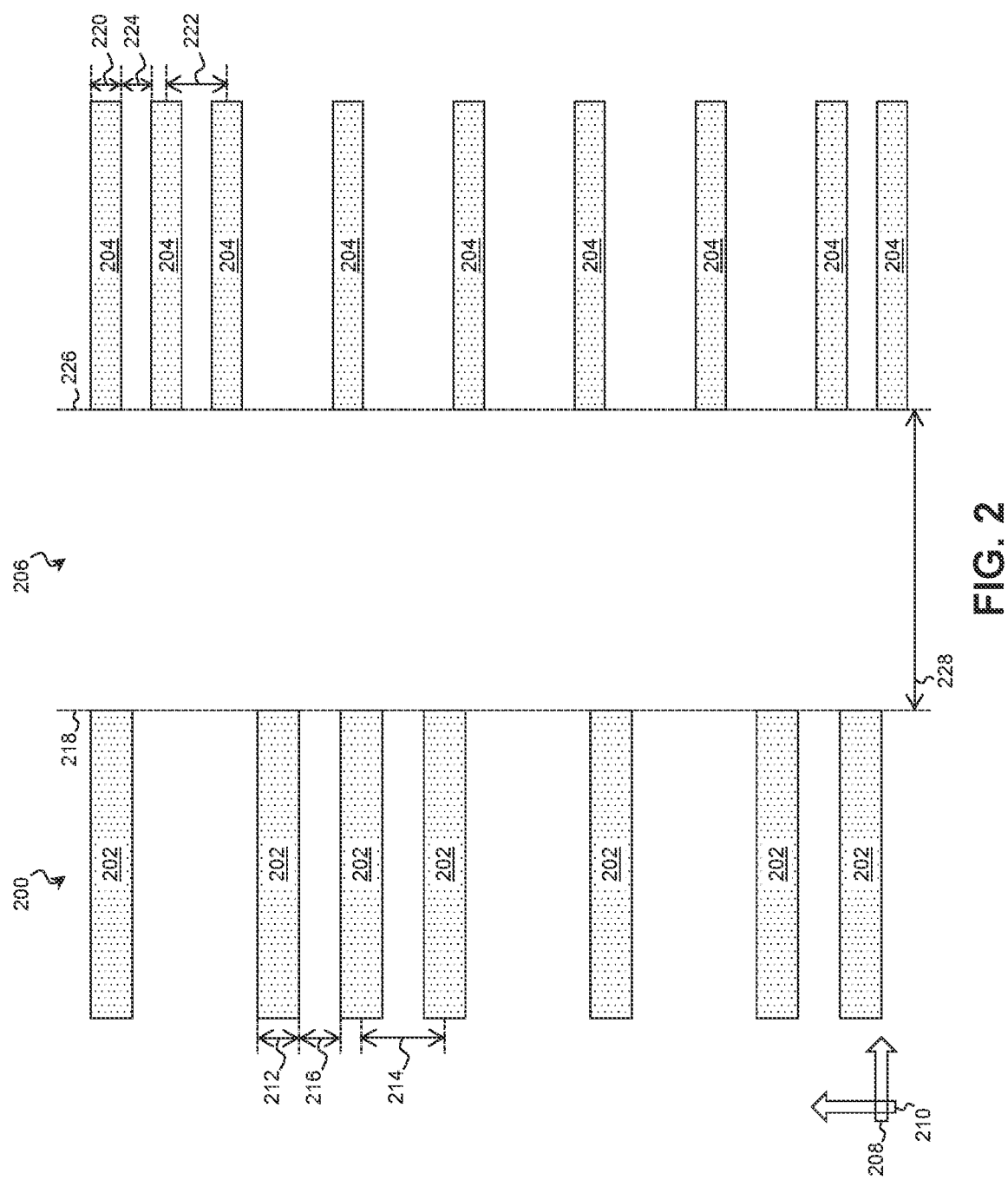
FIGS. 2-7 are diagrams of a portion of a layout for fabricating an integrated circuit undergoing the method according to various aspects of the present disclosure.

Referring first to block 102 of FIG. 1A and to FIG. 2, the layout 200 is received and includes a first set of shapes 202 and a second set of shapes 204 separated by a gap 206. In various examples, the layout 200 takes the form of a data file stored on a non-transitory computer-readable medium and is represented in a design standard such as GDSII, OASIS, and/or MEBES®, a registered trademark of Applied Materials. The layout 200 may be a digital representation of an integrated circuit, and shapes 202 and 206 of the layout 200 may correspond to and define physical features of an integrated circuit workpiece.

The layout 200 may include any number of shapes on any number of layers; however for clarity, only a limited number of shapes are shown. In particular, the layout 200 includes the shapes 202 of the first set and shapes 204 of the second set which represent similar features in the same layer. Shapes 202 extend in a first direction 208 and are substantially parallel to each other. The shapes 202 of the first set may have any suitable width 212 (in a second direction 210 perpendicular to the first direction 208), centerline-to-centerline pitch 214, and minimum spacing 216 (in the second direction 210). In some examples, the shapes 202 of the first set have line ends that terminate along a common boundary 218 in the second direction 210.

The shapes 204 of the second set also extend in the first direction 208 and are substantially parallel to each other. The shapes 204 of the second set may have any suitable width 220 (in the second direction 210), centerline-to-centerline pitch 222, and minimum spacing 224 (in the second direction 210), and the aspects of shapes 204 such as width, pitch, and spacing may vary from those of shapes 202. For example, the shapes 202 may correspond to circuit devices of a memory region, while shapes 204 correspond to circuit devices in a standard cell region with different design rules. In some examples, the shapes 202 correspond to circuit devices in a main functional region, while shapes 204 correspond to circuit devices in an I/O region with different design rules. In some examples, the shapes 202 correspond to circuit devices in a low-frequency and/or low-power region, while shapes 204 correspond to circuit devices in a high-frequency and/or high-power region with different design rules.

In some examples, the shapes 204 of the second set have line ends that terminate along a common boundary 226 in the second direction 210. The gap 206 extends between the boundary 218 of the first set and the boundary 226 of the second set and may have any suitable width 228 in the first direction 208. The width 228 of the gap 206 in the first direction 208 is described in more detail in subsequent figures.

Figure 3:
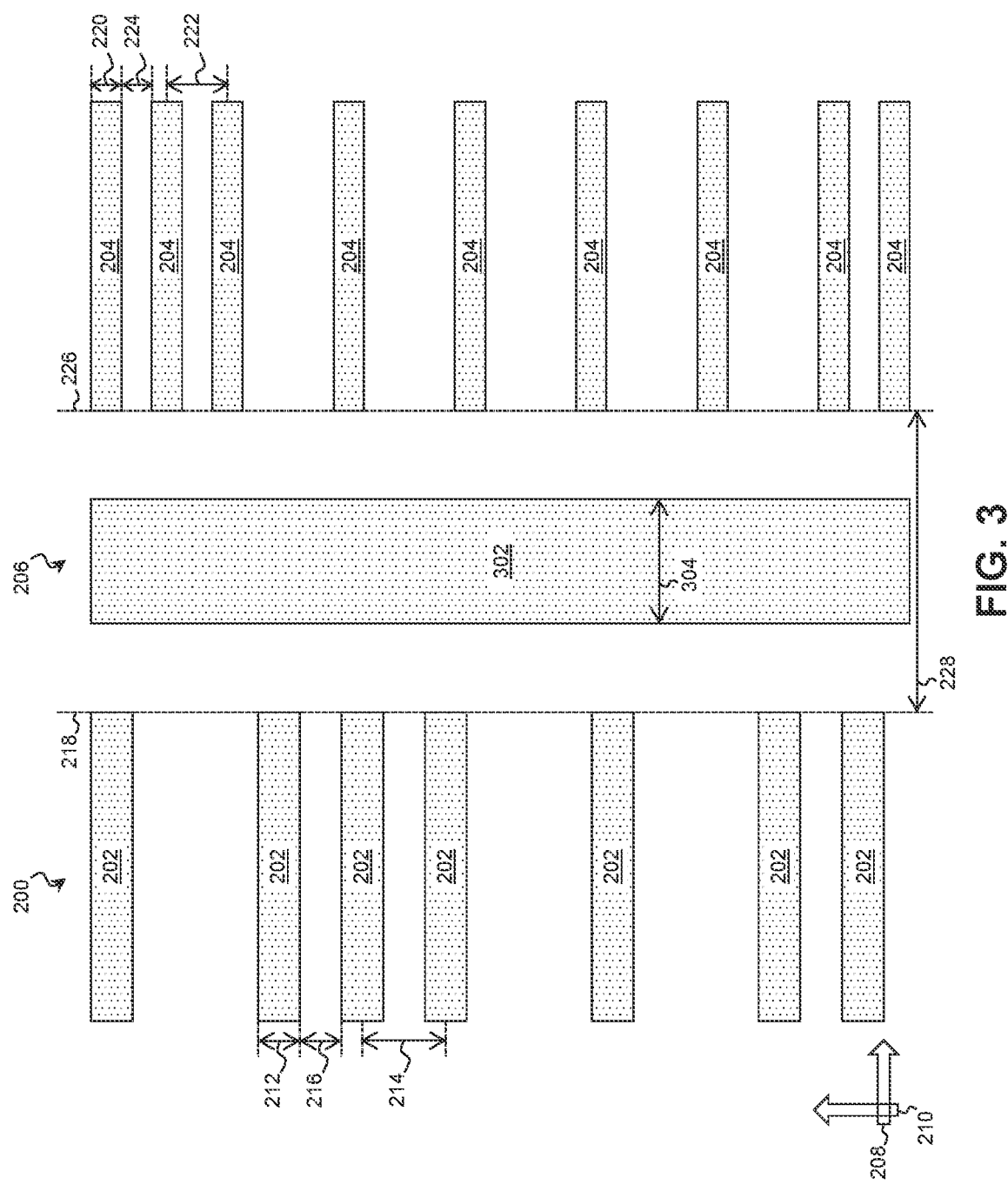

Referring to block 104 of FIG. 1A and to FIG. 3, a cross-member shape 302 is inserted in the layout 200 within the gap 206. The cross-member shape 302 is a printing feature and corresponds to a feature to be formed on the workpiece. In some examples, the feature formed by the cross-member shape 302 may be subsequently removed in a cut process, either in part or in whole, leaving the features formed by shapes 202 and 204. By connecting to subsequently-inserted line-end features, the cross-member shape 302 eliminates line ends by providing a contiguous shapes extending from the shapes 202 of the first set to the shapes 204 of the second set.

In some examples, the cross-member shape 302 is inserted at the center of the gap 206 equidistant from the boundary 218 of the first set of shapes 202 and the boundary 226 of the second set of shapes 204. The cross-member shape 302 extends in the second direction 210 perpendicular to the shapes 202 of the first set and the shapes 204 of the second set. The cross-member shape 302 may extend any amount past any number of shapes 202 and/or shapes 204. Furthermore, the cross-member shape 302 may have any suitable width 304 in the first direction 208, and in various embodiments the width is based on a multiple of a minimum feature width or pitch (e.g., at least 2 times a minimum centerline-to-centerline pitch).

Figure 4:
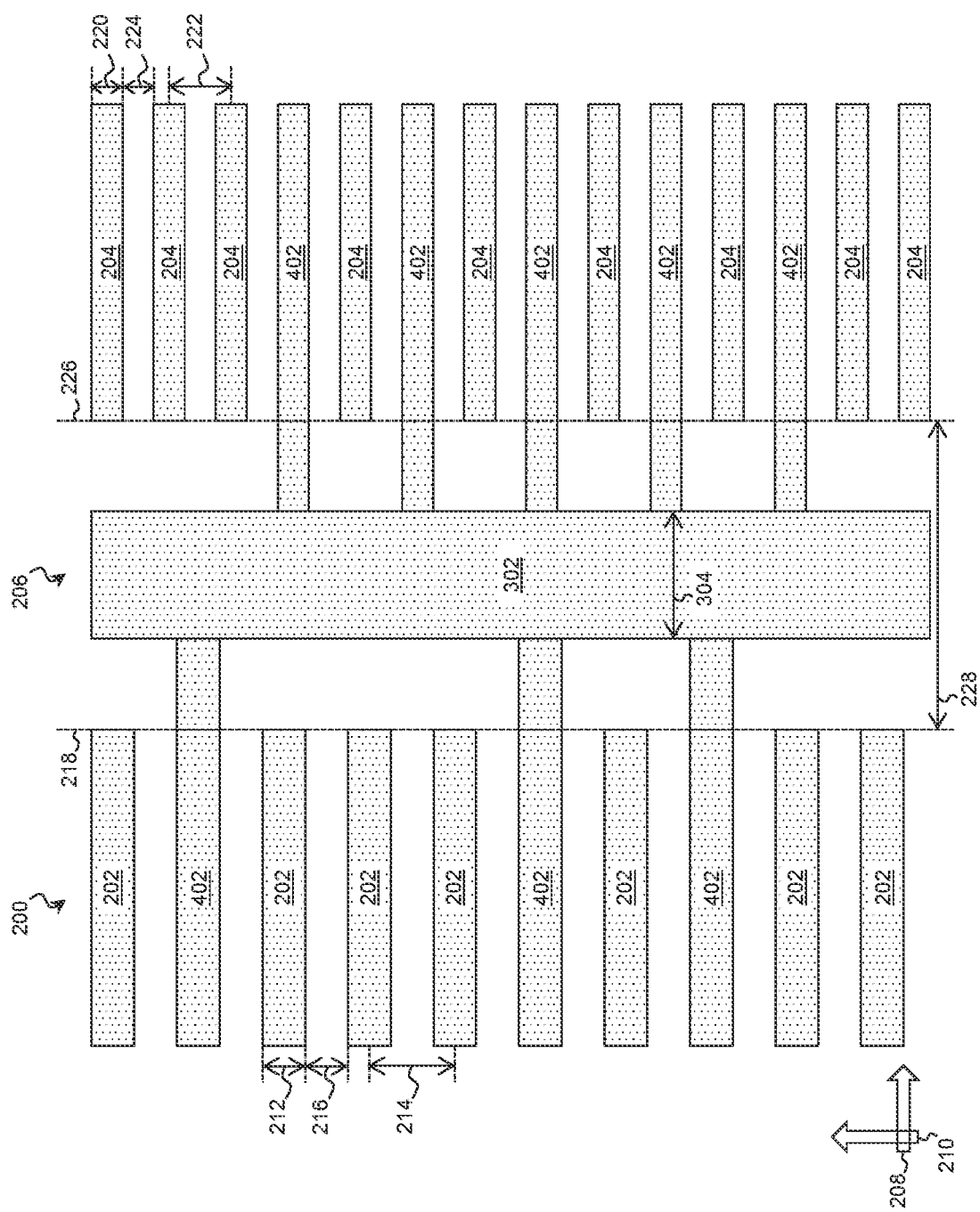

Referring to block 106 of FIG. 1A and to FIG. 4, fill shapes 402 are inserted in the layout 200 among the shapes 202 of the first set and/or the shapes 204 the second set. The fill shapes 402 are printing features and correspond to features to be formed on the workpiece. In some examples, the features formed by the fill shapes 402 are subsequently removed in a cut process, in part or in whole, leaving the features formed by shapes 202 and 204.

The fill shapes 402 extend in the first direction 208 and may extend to and couple to the cross-member shape 302. This avoids line ends at the termini of the fill shapes 402 and may avoid the associated rounding. In some examples, the fill shapes 402 are inserted in routing tracks within the first set and/or second set that are unoccupied due to the particular design implemented by the layout 200. In such examples, the fill shapes 402 may be arranged at the same centerline-to-centerline pitch and minimum spacing as the shapes 202 or 204 that they are disposed between. The fill shapes 402 may have any suitable width (in the second direction 210), and may be thinner than, thicker than, or substantially as thick as the shapes 202 and/or 204 that they are disposed between. In some examples, the fill shapes 402 that are disposed between shapes 202 have a different width, spacing, and/or pitch than the fill shapes 402 that are disposed between shapes 204.

Figure 5:
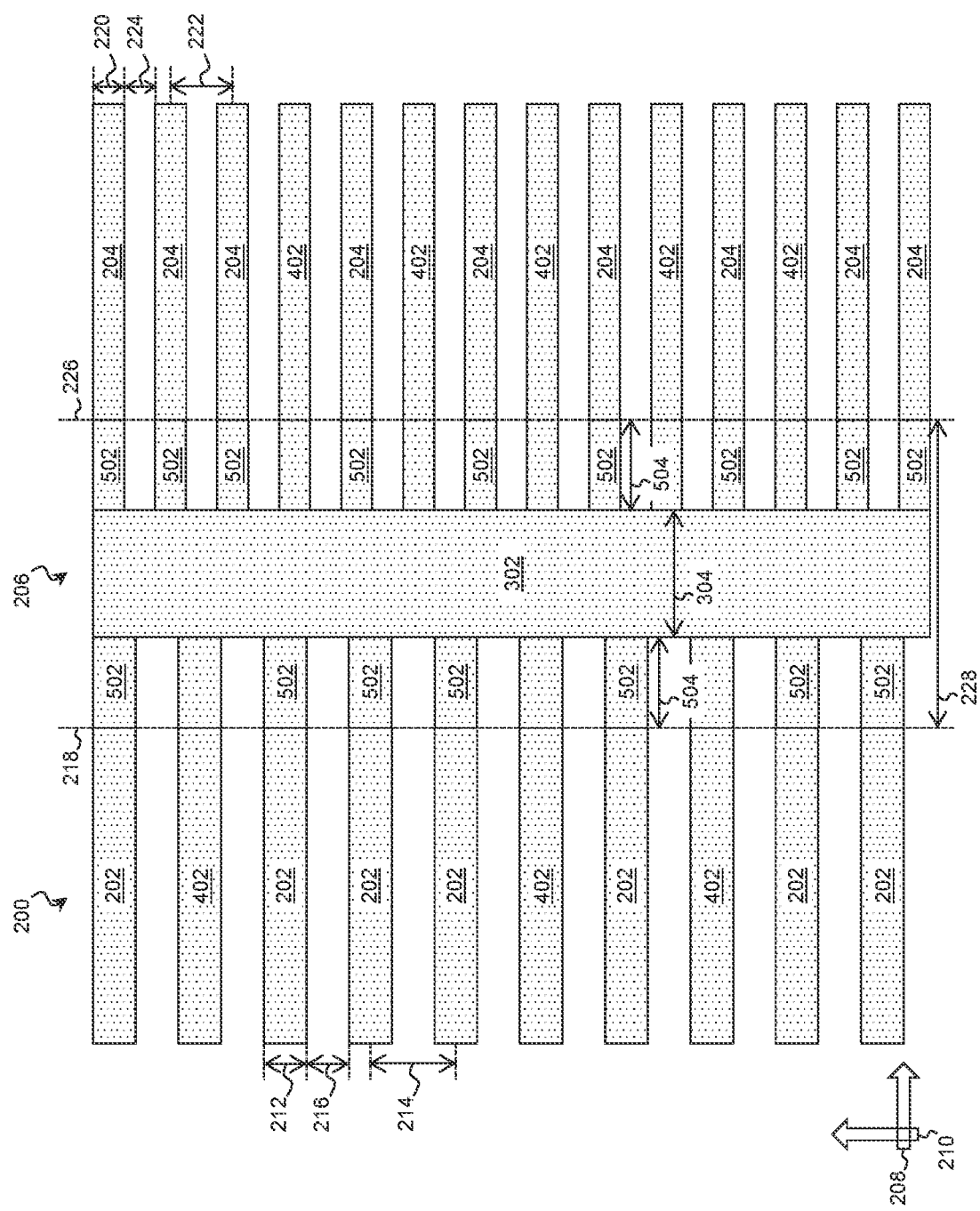

Referring to block 108 of FIG. 1A and to FIG. 5, line-end extensions 502 are inserted in the layout 200. The line-end extensions 502 are printing features and act to lengthen the features formed by shapes 202 and/or 204. In some examples, the features formed by the line-end extensions 502 are subsequently removed in a cut process, in part or in whole, leaving the features formed by shapes 202 and 204.

The line-end extensions 502 each extend from and couple a shape 202 of the first set or a shape 204 of the second set to the cross-member shape 302. In so doing, the line-end extensions 502 may avoid a line-end at their termini. Accordingly, the line-end extensions 502 may extend any length 504 in the first direction 208, and in various embodiments the length is based on a multiple of a minimum feature width or pitch (e.g., at least 1.5 times a minimum centerline-to-centerline pitch). In one such example where the width 304 of the cross-member shape 302 is at about 2 times the minimum centerline-to-centerline pitch, the total width 228 of the gap 206 is about 5 times the minimum centerline-to-centerline pitch. Thus, the addition of the cross-member shape 302 and/or line-end extensions 502 may permit the gap 206 to be narrower than other examples that lack one or both.

The width of the line-end extensions 502 (in the second direction 210) may be based on the shapes 202 or 204 that they extend from. Accordingly, in various examples, the line-end extensions 502 are thinner than, thicker than, or substantially as thick as the shapes 202 and/or 204 that they extend from. Where the line-end extensions 502 are substantially as thick as their adjoining shapes 202 or 204, this configuration may avoid a change in width and the associated rounding effects.

Figure 6:
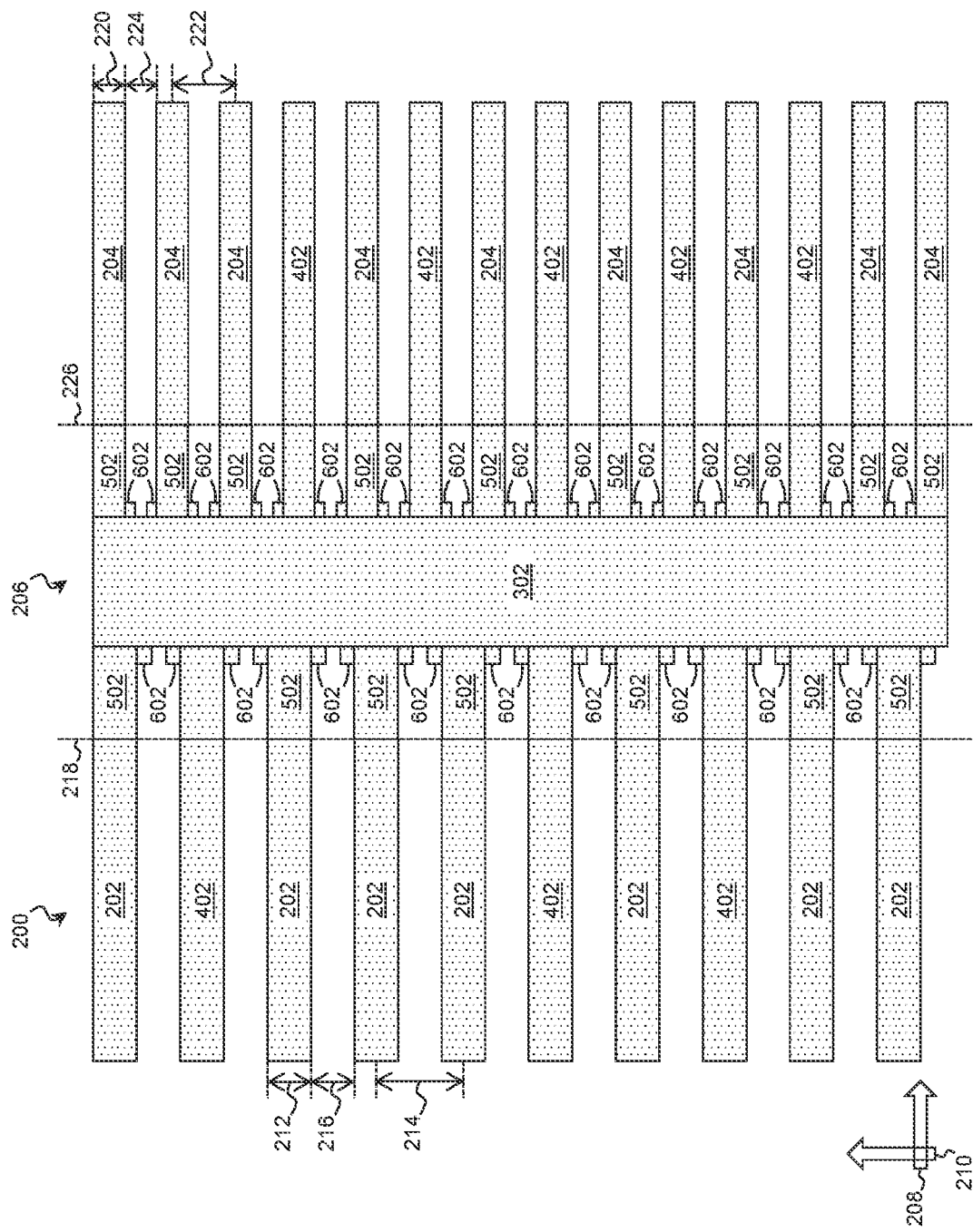

Referring to block 110 of FIG. 1A and to FIG. 6, OPC shapes 602 are inserted in the layout 200. The OPC shapes 602 may include Sub-Resolution Assist Features (SRAFs), serifs, hammerheads, other features and/or other feature enhancements. In some examples, the OPC shapes 602 include serif shapes added at junctions where line-end extensions 502 or fill shapes 402 meet the cross-member shape 302. These particular OPC shapes 602 may be configured to thicken the printed feature to avoid necking and other irregularities at the junctions.

Any suitable OPC technique may be used to identify where to insert OPC shapes 602. In some embodiments, rules-based OPC techniques compare the layout to a set of design rules (e.g., spacing rules, feature rules, etc.) to identify junctions and other locations with an elevated likelihood of printing errors. In some embodiments, pattern-based OPC techniques use pattern matching to identify locations with an elevated likelihood of printing errors. In rules-based and pattern-based techniques, an OPC shape 602 may be inserted anywhere that a probability of an error exceeds a threshold. Additionally or in the alternative, simulation-based OPC techniques may be used to simulate a photolithographic exposure using the features of the layout 200. From the simulated lithographic results, such techniques identify junctions and other locations where the resultant features are out of spec.

Figure 7:
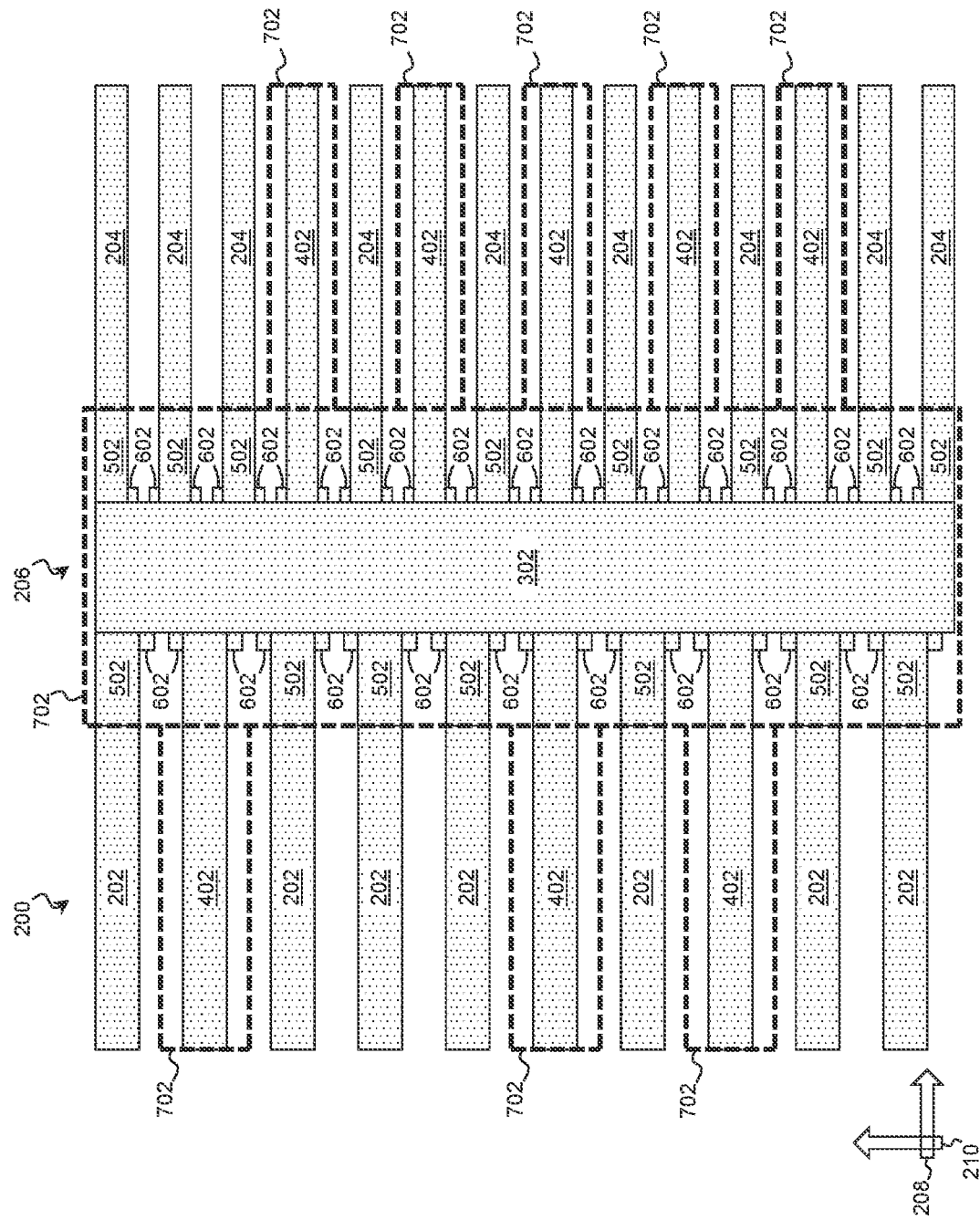
Figure 8:
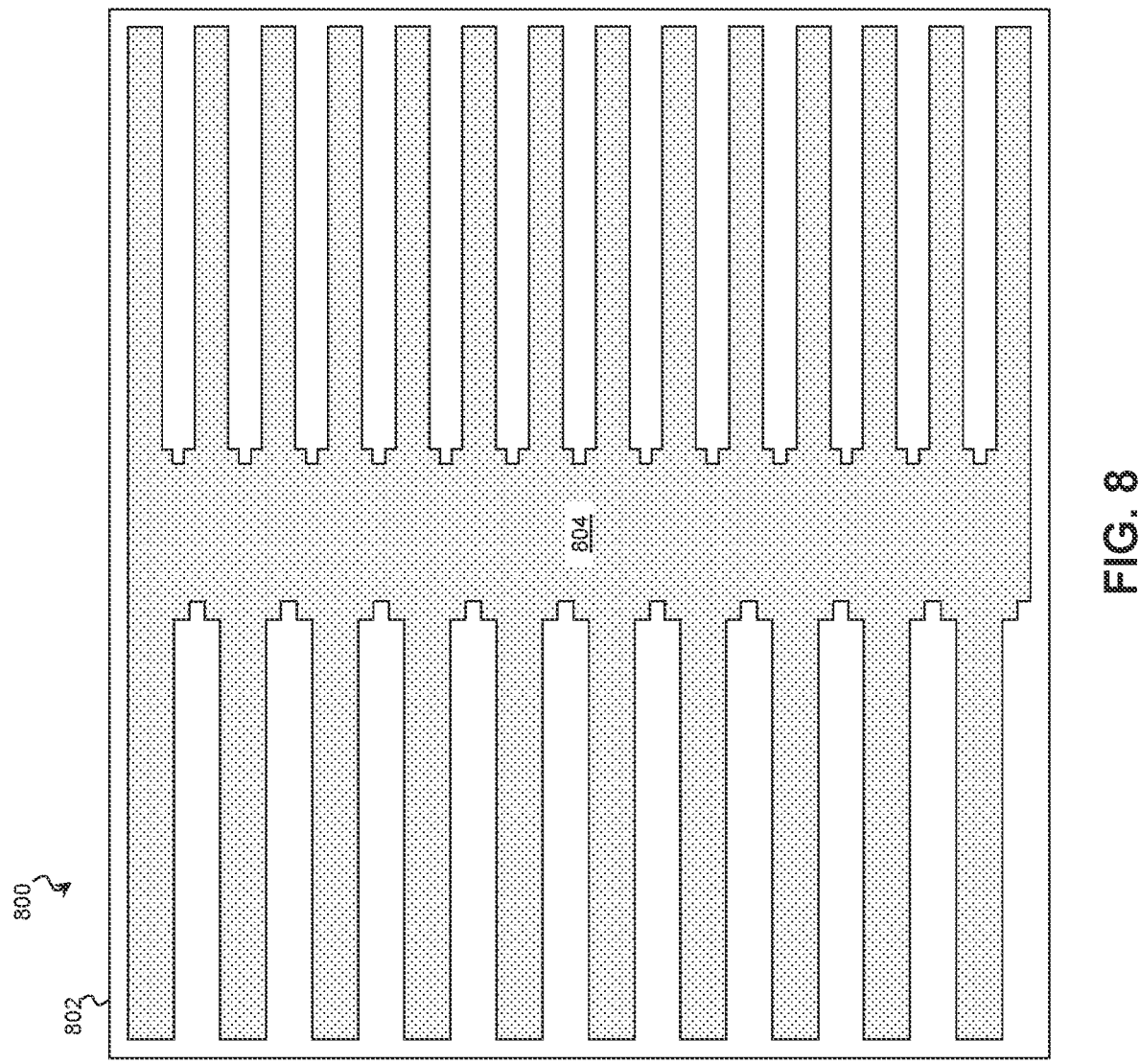
FIG. 8 is a top view diagram of a photomask manufactured according to the layout according to various aspects of the present disclosure.

Referring to block 112 of FIG. 1A and to FIG. 7, cut shapes 702 are defined. The cut shapes 702 define regions where features are to be removed, and in various examples, they cover and features formed by: the cross-member shape 302, some or all of the fill shapes 402, and/or some or all of the line-end extensions 502. Such features may be removed in part or in whole, and individual cut shapes 702 may be merged such that a single cut shape 702 removes more than one of the features.

In some examples, the cut shapes 702 are used to produce a cut mask that is distinct from the mask used to form the features of: shapes 202, shapes 204, the cross-member shape 302, the fill shapes 402, and/or the line-end extensions 502. After the latter mask is used to form the features, the cut mask is used to remove those extraneous features not corresponding to the shapes 202 and shapes 204. Despite the extra time, expense, and complexity of the cut mask, the improved fidelity provided by the cross-member shape 302, the fill shapes 402, and/or the line-end extensions 502 may justify its use. Because the cut shapes 702 correspond to a different mask, they may be added to the layout 200 and/or to a corresponding, yet separate, layout.

Referring to block 114 of FIG. 1A, the layout 200 is provided for fabricating the integrated circuit it specifies. Fabrication may include any number of process steps including lithography, etching, deposition, epitaxy, annealing, CMP, cleaning, and/or other processes to produce a physical integrated circuit device. In some examples, the fabrication process selectively processes parts of a workpiece according to the features formed by shapes 202, shapes 204, the cross-member shape 302, the fill shapes 402, the line-end extensions 502, and/or the OPC shapes 602. Blocks 116-146 and FIGS. 8-22 describe various examples of suitable integrated circuit fabrication processes. While some of these examples pattern a material layer using these features, other examples that use the features to selectively perform other fabrication process (e.g., epitaxy, deposition, implantation, etc.) are both contemplated and provided for.

Referring to block 116 of FIG. 1A and to FIG. 8, a photomask 800 is formed based on shapes 202, shapes 204, the cross-member shape 302, the fill shapes 402, the line-end extensions 502, and the OPC shapes 602. The photomask 800 has regions 802 and 804 with different optical properties. For a reflective photomask 800, regions 802 may be reflective regions and regions 804 may be absorptive regions, or vice-versa. For a transmissive photomask 800, regions 802 may be transmissive regions and regions 804 may be absorptive regions 802, or vice-versa. In subsequent processes, light reflected by or transmitted through the photomask 800 is used to selectively expose a workpiece based on these regions.

Referring to block 118 of FIG. 1A and to FIGS. 9A and 9B, a workpiece 900 is received and includes a substrate 902, a hard mask 904 disposed on the substrate 902, and a photoresist 906 disposed on the hard mask 904. In various examples, the substrate 902 includes an elementary (single element) semiconductor, such as silicon or germanium in a crystalline structure; a compound semiconductor, such as silicon germanium, silicon carbide, gallium arsenic, gallium phosphide, indium phosphide, indium arsenide, and/or indium antimonide; a non-semiconductor material, such as soda-lime glass, fused silica, fused quartz, and/or calcium fluoride ($CaF_2$); and/or combinations thereof.

The substrate 902 may be uniform in composition or may include various layers. The layers may have similar or different compositions, and in various embodiments, some substrate layers have non-uniform compositions to induce device strain and thereby tune device performance. Examples of layered substrates include silicon-on-insulator (SOI) substrates 902. In some such examples, a layer of the substrate 902 may include an insulator such as a semiconductor oxide, a semiconductor nitride, a semiconductor oxynitride, a semiconductor carbide, and/or other suitable insulator materials.

The substrate 902 may include any suitable hard mask 904 disposed thereupon. In some examples, the hard mask 904 includes a masking material used to protect underlying regions of the substrate 902 during processing. Suitable materials for a hard mask 904 include dielectrics (e.g., semiconductor oxides, semiconductor nitrides, semiconductor oxynitrides, semiconductor carbides, metal oxides, other metal compounds, etc.), metals, metal alloys, polysilicon, and/or other suitable materials. In an example, the hard mask 904 includes silicon nitride.

Referring to block 120 of FIG. 1A and to FIGS. 10A and 10B, a lithographic exposure is performed on the workpiece 900 using the photomask 800 that exposes selected regions of the photoresist 906 to radiation. The exposure causes a chemical reaction to occur in the exposed regions of the photoresist 906. After exposure, a developer is applied to the photoresist 906. The developer dissolves or otherwise removes either the exposed regions in the case of a positive resist development process or the unexposed regions in the case of a negative resist development process. Suitable positive developers include TMAH (tetramethyl ammonium hydroxide), KOH, and NaOH, and suitable negative developers include solvents such as n-butyl acetate, ethanol, hexane, benzene, and toluene. In various examples, the developed photoresist 906 exposes portions of the hard mask 904 that do not correspond to the shapes 202, shapes 204, the cross-member shape 302, the fill shapes 402, the line-end extensions 502, and/or the OPC shapes 602 of the layout 200.

Figure 11A:
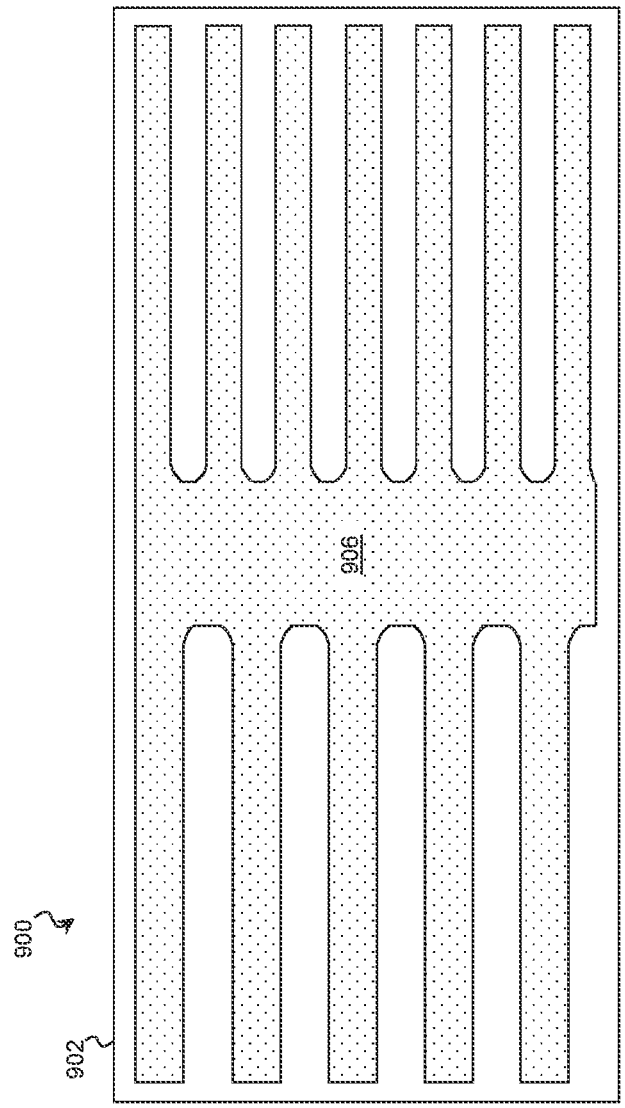
Figure 11B:
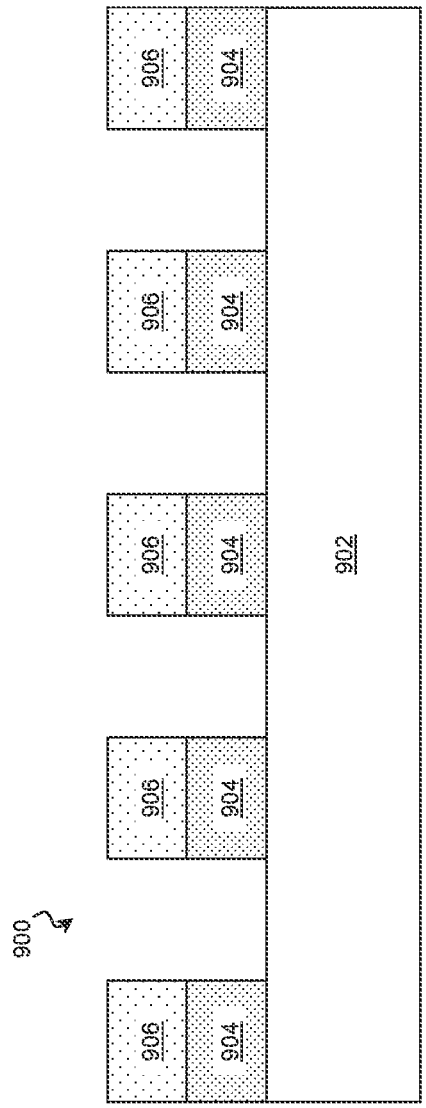
Figure 12:
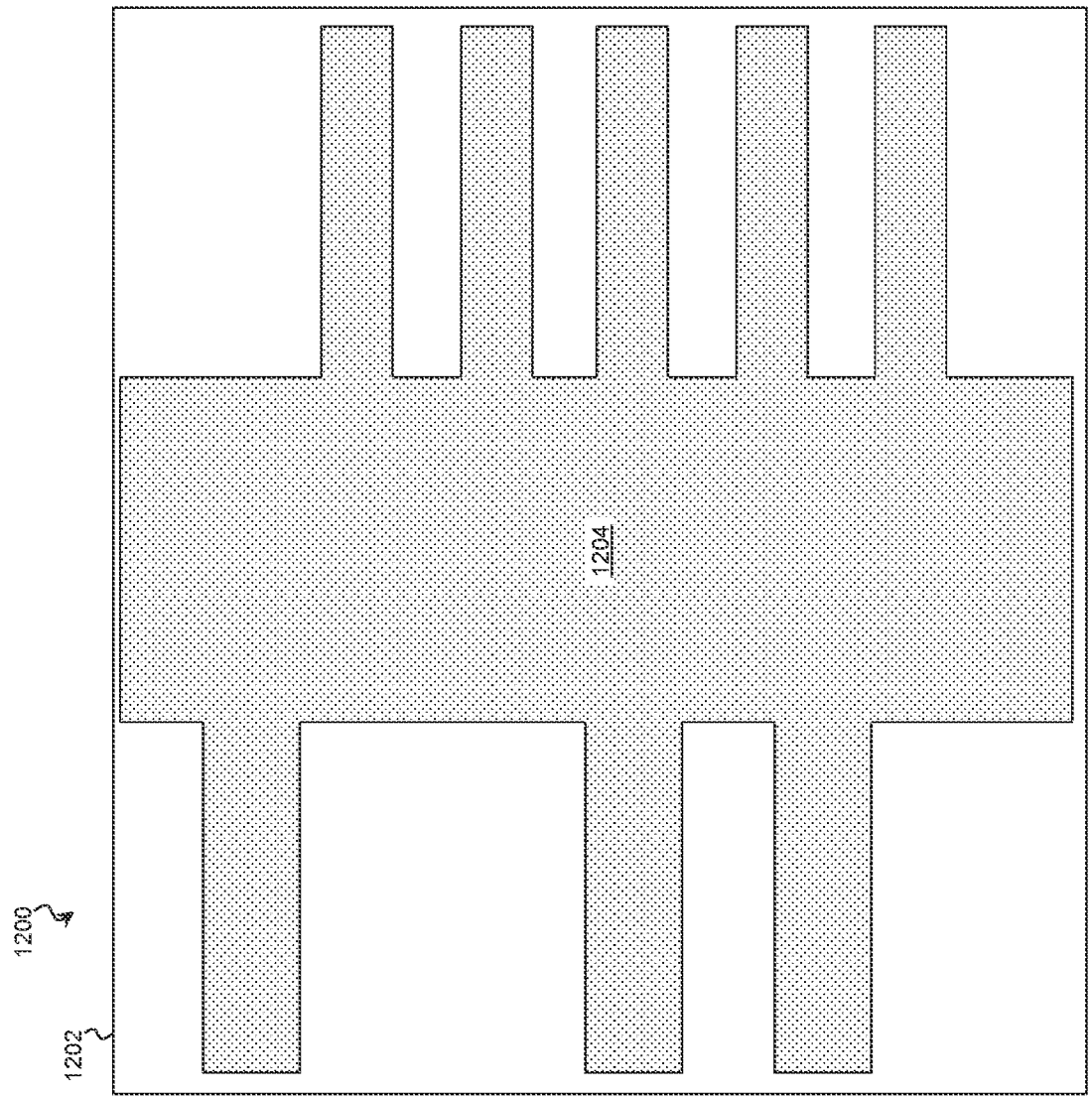
FIG. 12 is a top view diagram of a cut photomask manufactured according to the layout 200 according to various aspects of the present disclosure.

Referring to block 122 of FIG. 1A and to FIGS. 11A and 11B, after the photoresist 906 is developed, the hard mask 904 may be patterned by an etching process that removes portions of the hard mask 904 exposed by the photoresist 906. In various examples, etching is performed by wet etching, dry etching, Reactive Ion Etching (RIE), ashing, and/or other etching methods using etchant chemistries such as carbon tetrafluoride ($CF_4$), difluoromethane ($CH_2F_2$), trifluoromethane ($CHF_3$), other suitable etchants, and/or combinations thereof. The etching process and/or chemistry may be selected to etch the hard mask 904 without significant etching of the photoresist 906 and/or the substrate 902. After etching the hard mask 904, the photoresist 906 may be removed. The patterned hard mask 904 may have features corresponding to the shapes 202, shapes 204, the cross-member shape 302, the fill shapes 402, the line-end extensions 502, and/or the OPC shapes 602.

Referring to block 124 of FIG. 1A and to FIG. 12, a cut photomask 1200 is formed based on the cut shapes 702 of the layout. Similar to photomask 800, the cut photomask 1200 has regions 1202 and 1204 with different optical properties. For a reflective cut photomask 1200, regions 1202 may be reflective regions and regions 1204 may be absorptive regions, or vice-versa. For a transmissive cut photomask 1200, regions 1202 may be transmissive regions and regions 1204 may be absorptive regions, or vice-versa. In subsequent processes, light reflected by or transmitted through the cut photomask 1200 is used to selectively expose the workpiece 900 based on these regions.

Referring to block 126 of FIG. 1B and to FIGS. 13A and 13B, a second photoresist 1302 is formed on the substrate 902 and a lithographic exposure is performed on the workpiece 900 using the cut photomask 1200 that exposes selected regions of the second photoresist 1302 to radiation.

This may be performed substantially as described in block 120 of FIG. 1A. In various examples, the patterned second photoresist 1302 exposes portions of the hard mask that correspond to the cross-member shape 302, the fill shapes 402, the line-end extensions 502, and/or the OPC shapes 602 of the layout 200 based on the cut shapes 702 without exposing portions that correspond to shapes 202 and 204.

Referring to block 128 of FIG. 1B and to FIGS. 14A and 14B, an etching process is performed that removes portions of the hard mask 904 exposed by the second photoresist 1302. In various examples, etching is performed by wet etching, dry etching, RIE, ashing, and/or other etching methods using any suitable etchant chemistries. The etching process and/or chemistry may be selected to etch the hard mask 904 without significant etching of the second photoresist 1302 and/or the substrate 902. After etching the hard mask 904, the second photoresist 1302 may be removed. The etching defines mandrels 1402 in the remaining hard mask 904 material.

It is noted that while blocks 130-144 describe etching the substrate 902 using the hard mask's mandrels 1402 to define fins for a FinFET device, other examples use the patterned hard mask 904 in etching processes to define gate features, to define conductive traces and/or vias, and/or to define other features. Further examples use the patterned hard mask 904 in processes other than etching (e.g., epitaxy, deposition, implantation, etc.). In some examples, the mandrels 1402 are used in a double-patterning, quadruple-patterning, or other multiple-patterning processes to form more than one shape from each mandrel 1402. The examples of blocks 130-140 and FIGS. 15A-20 describe a quadruple-patterning process, although it is understood that the process may be modified to perform other multiple-patterning processes.

Figure 15A:
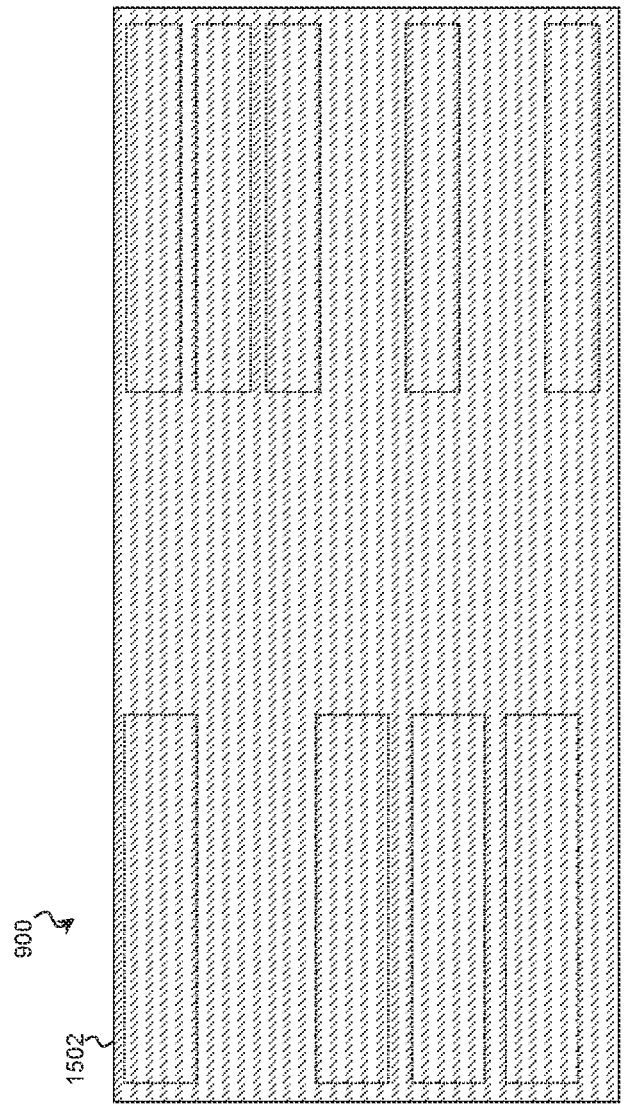
Figure 15B:
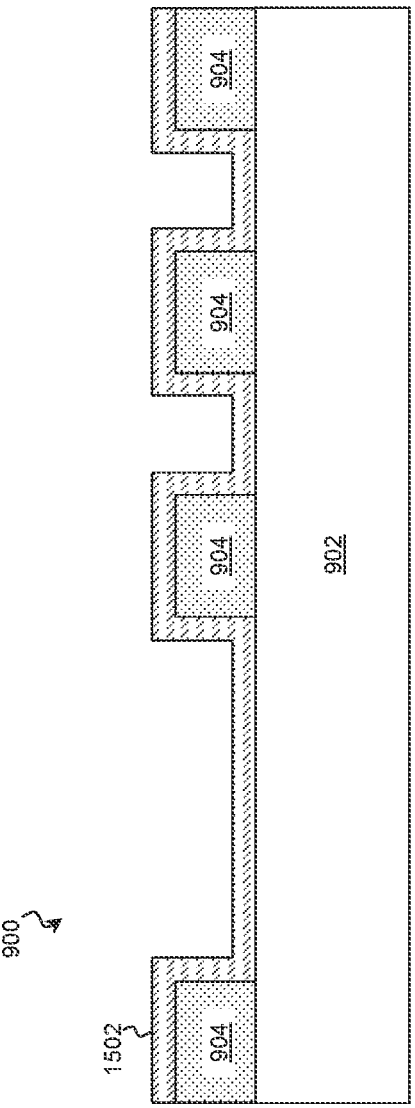
Figure 21:
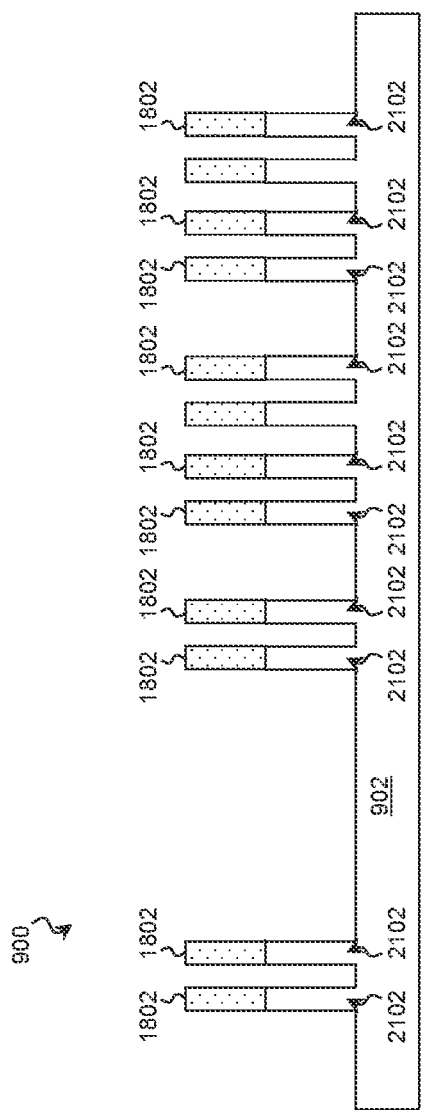

Referring to block 130 of FIG. 1B and to FIGS. 15A and 15B, a first spacer layer 1502 is formed on the mandrels 1402 of the hard mask 904. The first spacer 1502 layer may include any suitable material (e.g., semiconductor, semiconductor oxide, semiconductor nitride, semiconductor oxynitride, semiconductor carbide, etc.), and may be selected to have a different etchant selectivity than the hard mask 904. The first spacer layer 1502 may be formed by any suitable process including CVD, HDP-CVD, ALD, PVD, and/or other suitable deposition techniques. In some such embodiments, the first spacer layer 1502 is deposited conformably by CVD or ALD.

Referring to block 132 of FIG. 1B and to FIGS. 16A and 16B, an etching process is performed on the first spacer layer 1502 to remove the first spacer layer 1502 from horizontal surfaces of the hard mask 904 and the substrate 902. The etching process may be performed using an anisotropic (directional) etching technique such as an anisotropic plasma etching or other suitable etching technique. As can be seen in FIGS. 16A and 16B, portions of the first spacer layer 1502 remain on the vertical surfaces of the hard mask 904.

Referring to block 134 of FIG. 1B and to FIG. 17, the mandrels 1402 of the hard mask 904 are removed from the substrate 902. In various examples, the mandrels 1402 are removed by wet etching, dry etching, RIE, ashing, and/or other etching methods using any suitable etchant chemistries. The etching process and/or chemistry may be selected to etch the hard mask 904 without significant etching of the first spacer layer 1502 and/or the substrate 902.

The techniques of blocks 130-134 may be repeated any number of times to form additional spacer features. Referring to block 136 of FIG. 1B and to FIG. 18, a second spacer layer 1802 is formed on the patterned first spacer layer 1502. The second spacer layer may include any suitable material (e.g., semiconductor, semiconductor oxide, semiconductor nitride, semiconductor oxynitride, semiconductor carbide, etc.), and may be selected to have a different etchant selectivity than the first spacer layer 1502. The second spacer layer 1802 may be deposited by any suitable process including CVD, HDP-CVD, ALD, PVD, and/or other suitable deposition techniques. In some such embodiments, the second spacer layer 1802 is deposited conformably by CVD or ALD.

Referring to block 138 of FIG. 1B and to FIG. 19, an etching process is performed on the second spacer layer 1802 to remove the second spacer layer 1802 from horizontal surfaces of the first spacer layer 1502 and the substrate 902. The etching process may be performed using an anisotropic etching technique such as an anisotropic plasma etching or other suitable etching technique. After etching, portions of the second spacer layer 1802 remain on the vertical surfaces of the first spacer layer 1502.

Referring to block 140 of FIG. 1B and to FIG. 20, the remainder of the first spacer layer 1502 is removed. In various examples, the first spacer layer 1502 is removed via an etching process such as wet etching, dry etching, RIE, ashing, and/or other etching methods using any suitable etchant chemistries. The etching process and/or chemistry may be selected to etch the first spacer layer 1502 without significant etching of the second spacer layer 1802 and/or the substrate 902.

As noted above, the techniques of blocks 130-140 may be repeated any number of times to form a spacer layer with a desired number of spacer features. When the desired spacer layer has been formed, it may be used to etch the substrate 902. For example, referring to block 142 of FIG. 1B and to FIG. 21, an etching process is performed to etch the substrate 902 and thereby define fins 2102 therein. In various examples, etching is performed by wet etching, dry etching, RIE, ashing, and/or other etching methods using any suitable etchant chemistries. The etching process and/or chemistry may be selected to etch the substrate 902 without significant etching of the second spacer layer 1802. The duration of the etching process may be configured to produce fins 2102 of any suitable dimension.

Figure 22:
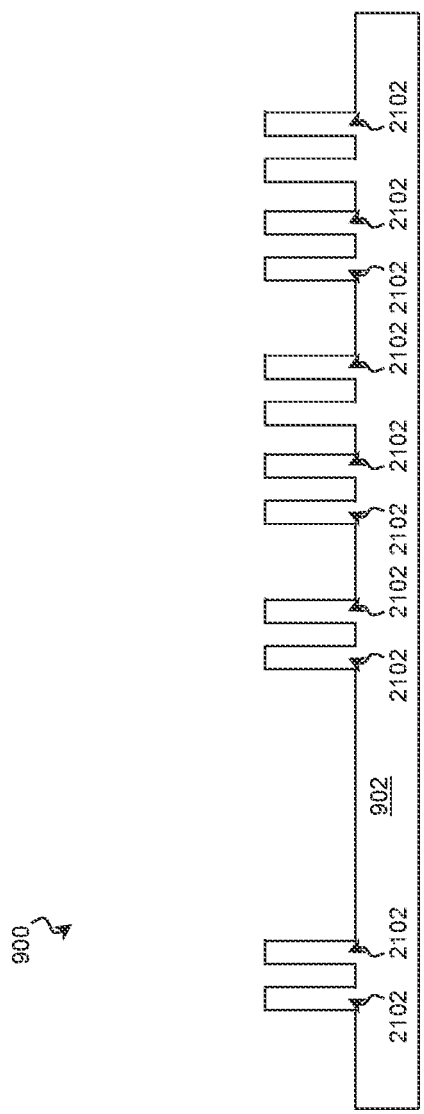

Referring to block 144 of FIG. 1B and to FIG. 22, the remainder of the second spacer layer 1802 is removed from the substrate 902. In various examples, the second spacer layer 1802 is removed by etching such as wet etching, dry etching, RIE, ashing, and/or other etching methods using any suitable etchant chemistries. The etching process and/or chemistry may be selected to etch the second spacer layer 1802 without significant etching of the substrate 902.

Referring to block 146 of FIG. 1B, the workpiece 900 is provided for further fabrication of the integrated circuit. In various examples, fabrication includes: forming a placeholder poly gate over a channel region of the fins 2102, forming source/drain features on the fins 2102, replacing the placeholder poly gate with a metal gate, forming an interconnect electrically coupling the metal gate and/or the source/drain features to the remainder of the circuit, and/or other suitable fabrication processes.

Figure 23:
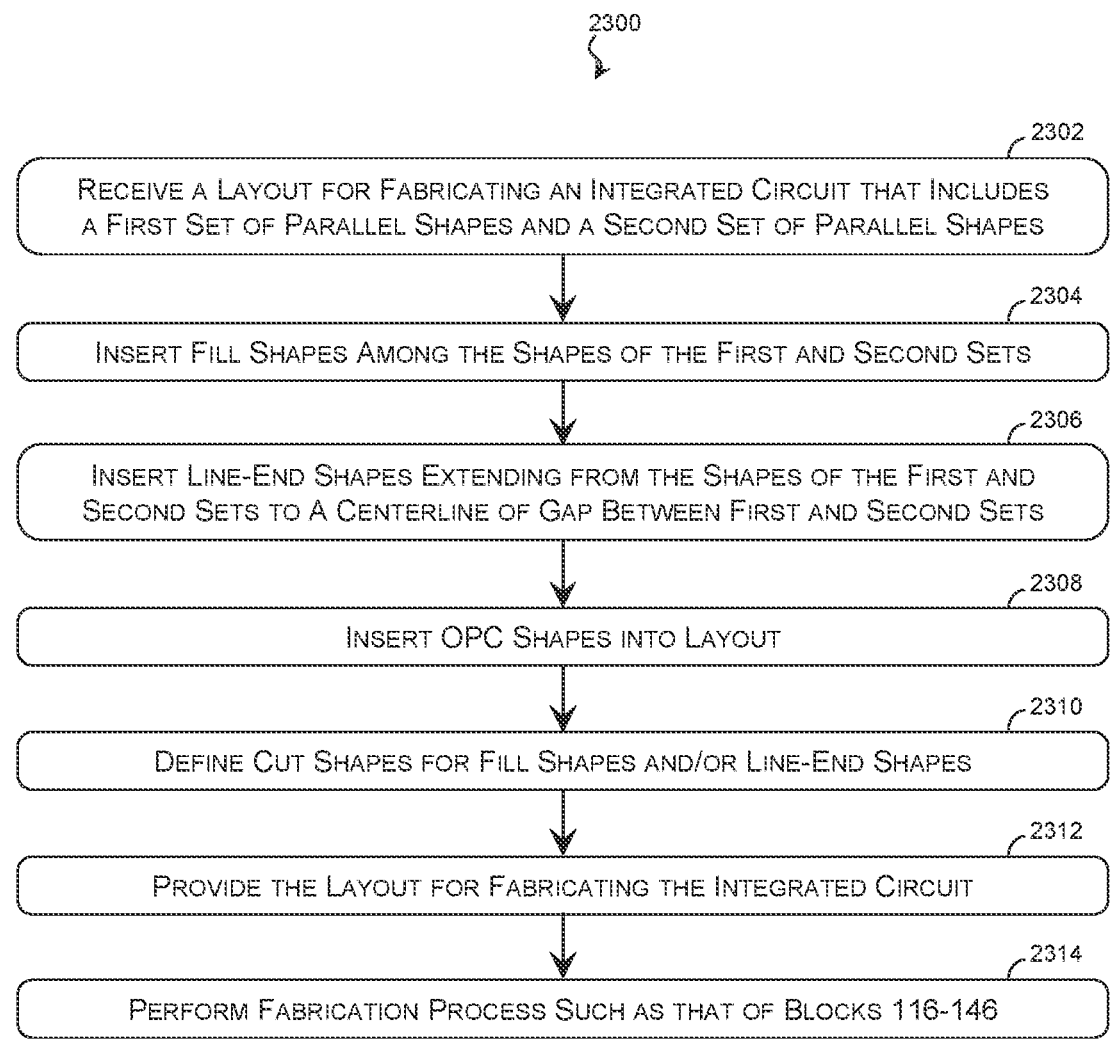
FIG. 23 is a flow diagram of a method of fabricating an integrated circuit with line-end extensions according to various aspects of the present disclosure.

In some examples, the cross-member shape may be omitted and the line-end extensions may be extended until they meet. Some such examples are described with reference to FIGS. 23-27. In that regard, FIG. 23 is a flow diagram of a method 2300 of fabricating an integrated circuit according to various aspects of the present disclosure. Additional steps can be provided before, during, and after the method 2300, and some of the steps described can be replaced or eliminated for other embodiments of the method 2300. FIGS. 24-27 are top views of a portion of a layout 2400 for fabricating an integrated circuit undergoing the method 2300 according to various aspects of the present disclosure.

Figure 24:
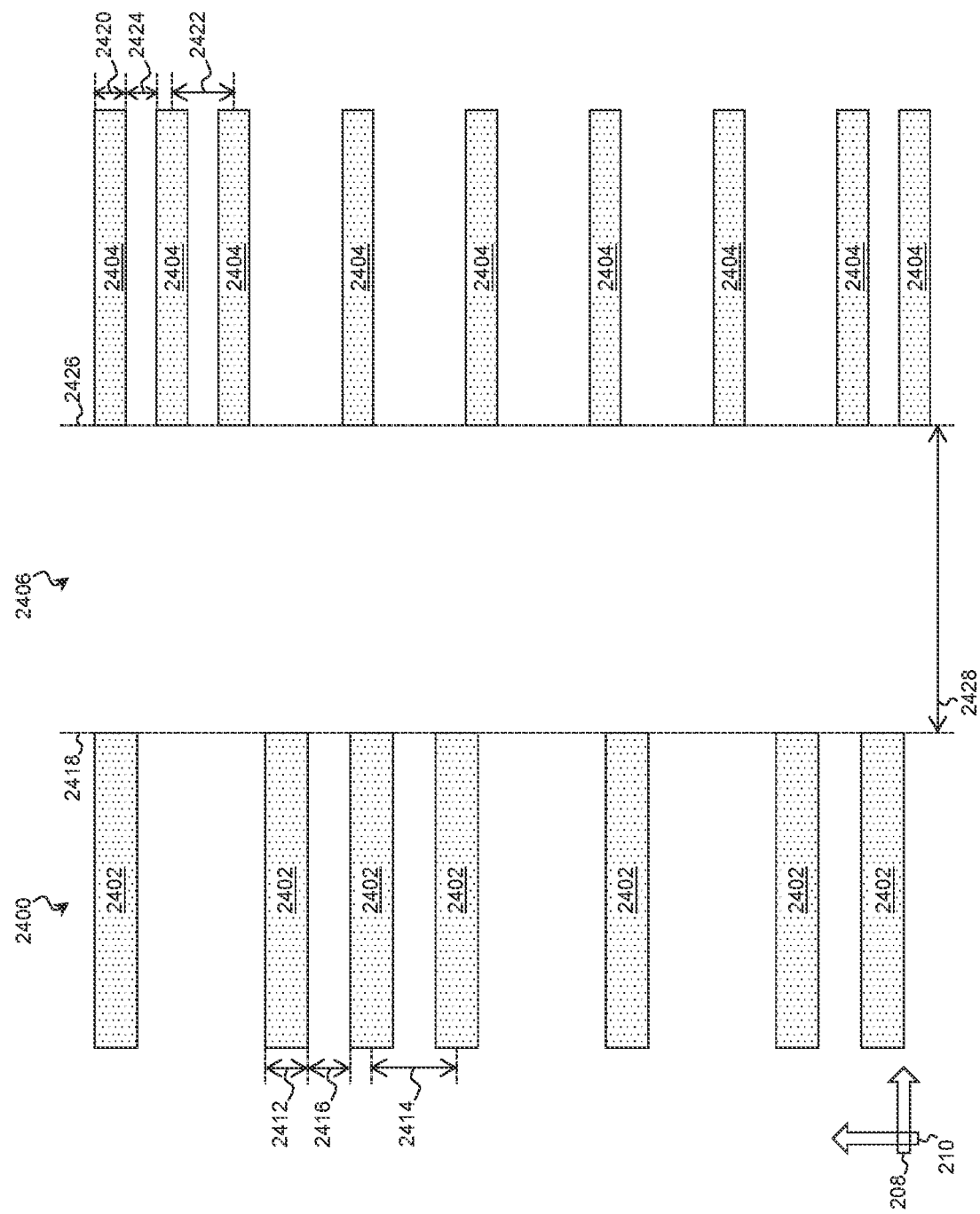
FIGS. 24-28 are top views of a portion of a layout for fabricating an integrated circuit undergoing the method according to various aspects of the present disclosure.

Referring first to block 2302 of FIG. 23 and to FIG. 24, a layout 2400 is received that includes a first set of shapes 2402 and a second set of shapes 2404 separated by a gap 2406. In many regards, the layout 2400 may be substantially similar to layout 200 of FIGS. 2-7. The layout 2400 may be a digital representation of an integrated circuit, and shapes 2402 and 2404 of the layout 2400 may correspond to and define physical features of a workpiece.

The layout 2400 may include any number of shapes on any number of layers. Shapes 2402 of the first set and shapes 2404 of the second set represent similar features in the same layer. Shapes 2402 extend in the first direction 208 and are substantially parallel to each other. The shapes 2402 of the first set may have any suitable width 2412 (in the second direction 210), centerline-to-centerline pitch 2414, and minimum spacing 2416 (in the second direction 210). In some examples, the shapes 2402 of the first set have line ends that terminate along a common boundary 2418 in the second direction 210.

The shapes 2404 of the second set also extend in the first direction 208 and are substantially parallel to each other. The shapes 2404 of the second set may have any suitable width 2420 (in the second direction 210), centerline-to-centerline pitch 2422, and minimum spacing 2424 (in the second direction 210), and the aspects of shapes 2404 such as width, pitch, and spacing may vary from those of shapes 2402. In some examples, the shapes 2404 of the second set have line ends that terminate along a common boundary 2426 in the second direction 210. The gap 2406 extends between the boundary 2418 of the first set and the boundary 2426 of the second set and may have any suitable width 2428 in the first direction 208.

Figure 25:
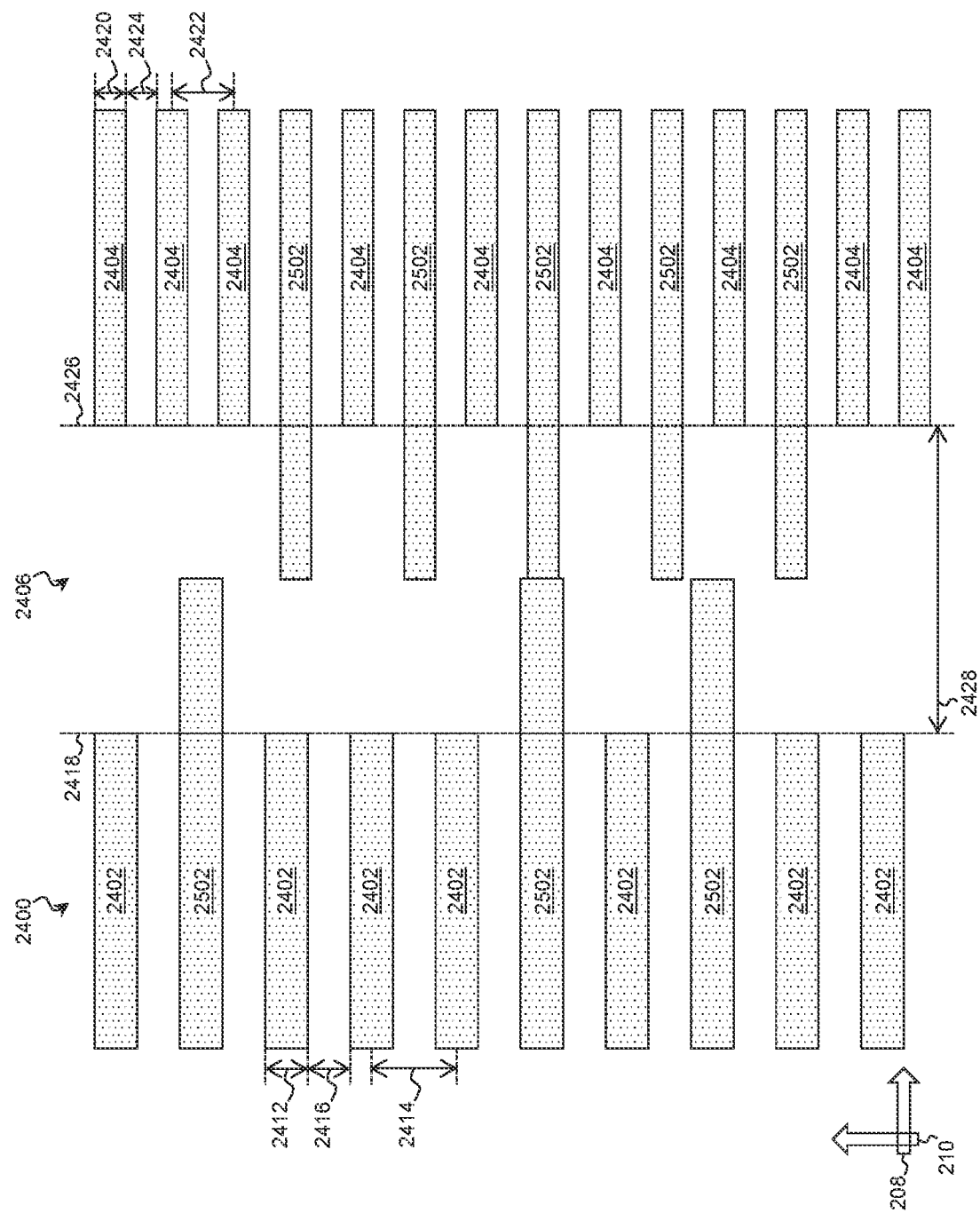

Referring to block 2304 of FIG. 23 and to FIG. 25, fill shapes 2502 are inserted in the layout 2400 between the shapes 2402 of the first set and/or the shapes 2404 the second set. This may be performed substantially as described in block 106 of FIG. 1A. The fill shapes 2502 are printing features and correspond to features to be formed on the workpiece. In some examples, the features formed by the fill shapes 2502 are subsequently removed in a cut process, in part or in whole, leaving the features formed by shapes 2402 and 2404.

In some examples, the fill shapes 2502 are inserted in unoccupied routing tracks within the first set and/or second set. In such examples, the fill shapes 2502 may be arranged at the same centerline-to-centerline pitch as the shapes 2402 and/or 2404 that they are disposed between. The fill shapes 2502 may have any suitable width (in the second direction 210), and may be thinner than, thicker than, or substantially as thick as the shapes 2402 and/or 2404 that they are disposed between. In some examples, the fill shapes 2502 that are disposed between shapes 2402 have a different width, spacing, and/or pitch than the fill shapes 2502 that are disposed between shapes 2404.

The fill shapes 2502 may extend in the first direction 208 to a centerline of the gap 2406. Some fill shapes 2502 disposed within the first set of shapes 2402 extend to and couple to fill shapes 2502 disposed within the second set of shapes 2404. Depending on the width, pitch, and/or spacing, some fill shapes 2502 couple to more than one other fill shape 2502. While the fill shapes 2502 that couple may not align completely, the resultant jog or change of width may be less abrupt than a line end. Accordingly, coupling the fill shapes 2502 may reduce the rounding severity.

Figure 26:
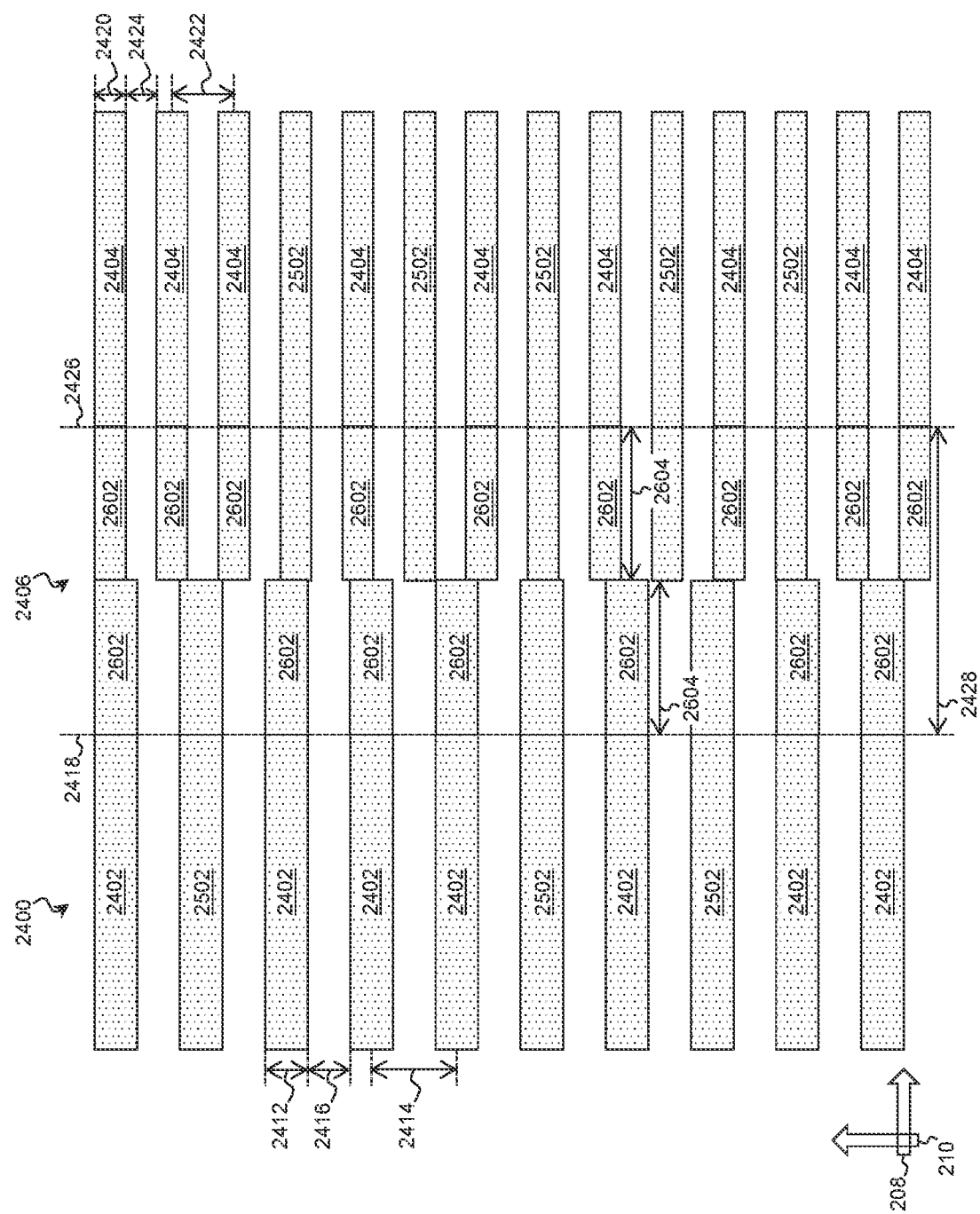

Referring to block 2306 of FIG. 23 and to FIG. 26, line-end extensions 2602 are inserted in the layout 2400. This may be performed substantially as described in block 108 of FIG. 1A. The line-end extensions 2602 are printing features and act to lengthen the features formed by shapes 2402 and/or 2404. In some examples, the features formed by the line-end extensions 2602 are subsequently removed in a cut process, in part or in whole, leaving the features formed by shapes 2402 and 2404.

The line-end extensions 2602 each extend from a shape 2402 of the first set or a shape 2404 of the second set to the centerline of the gap 2406. Accordingly, the line-end extensions 2602 may extend any length 2604 in the first direction 208, and in various embodiments the length is based on a multiple of a minimum feature width or pitch (e.g., at least 3 times a minimum centerline-to-centerline pitch). The line-end extensions 2602 may couple to other line-end extensions 2602 and/or the fill shapes 2502 in the gap 2406. Depending on the width, pitch, and/or spacing, some line-end extensions 2602 couple to more than one other line-end extension 2602 and/or fill shape 2502. As with the fill shapes 2502, the resultant jog or change of width at the junction may be less abrupt than a line end.

The width of the line-end extensions 2602 (in the second direction 210) may be based on the shapes 2402 or 2404 that they extend from. Accordingly, in various examples, the line-end extensions 2602 are thinner than, thicker than, or substantially as thick as the shapes 2402 and/or 2404 that they extend from.

Figure 27:
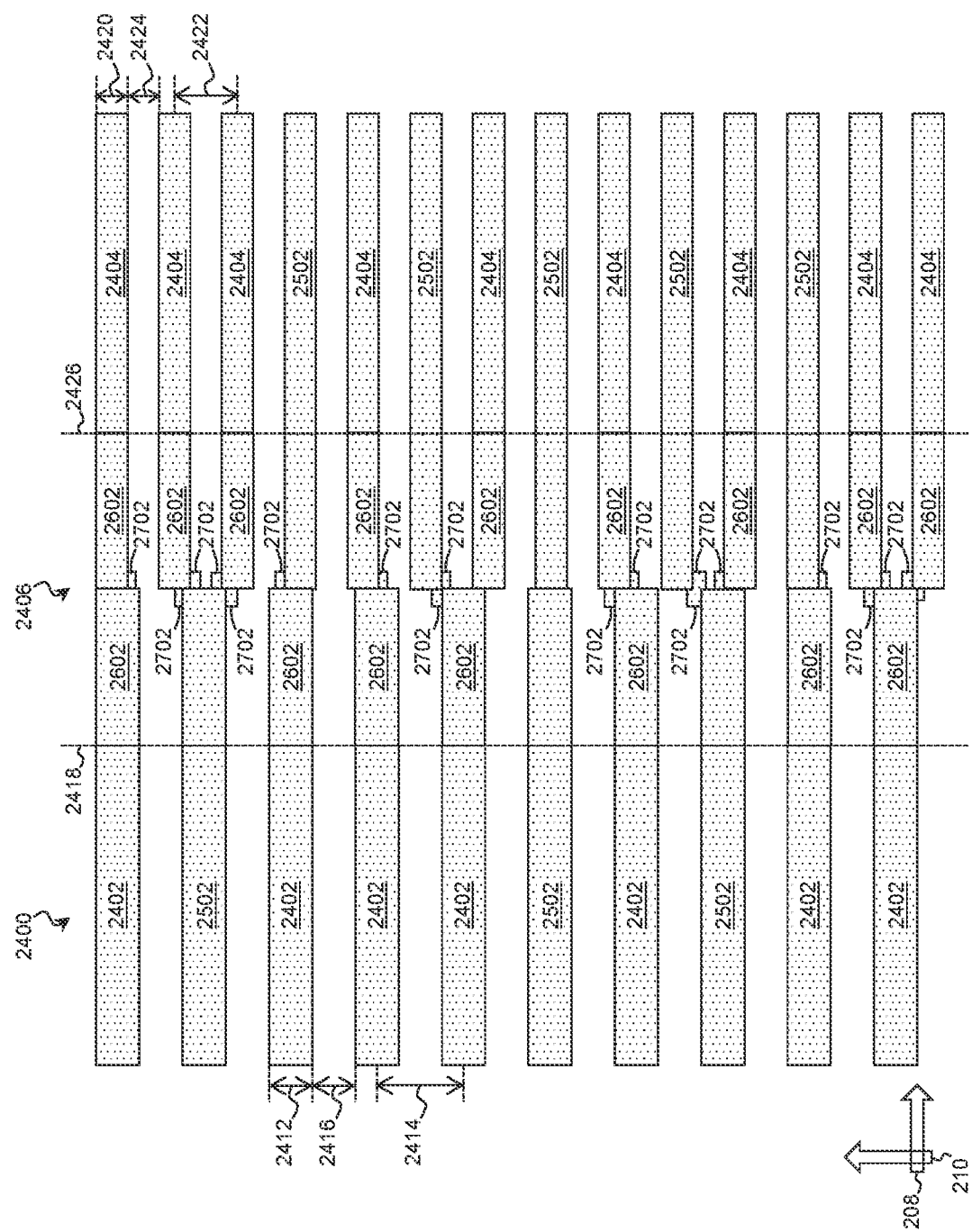

Referring to block 2308 of FIG. 23 and to FIG. 27, OPC shapes 2702 are inserted in the layout 2400. This may be performed substantially as described in block 110 of FIG. 1A. In some examples, the OPC shapes 2702 include serif shapes added at junctions where line-end extensions 2602 and/or fill shapes 2502 couple. These particular OPC shapes 2702 may be configured to thicken the printed shape to avoid necking and other irregularities at the junctions. Furthermore, some OPC shapes 2702 join line-end extensions 2602 and/or fill shapes 2502 that would not otherwise couple.

Figure 28:
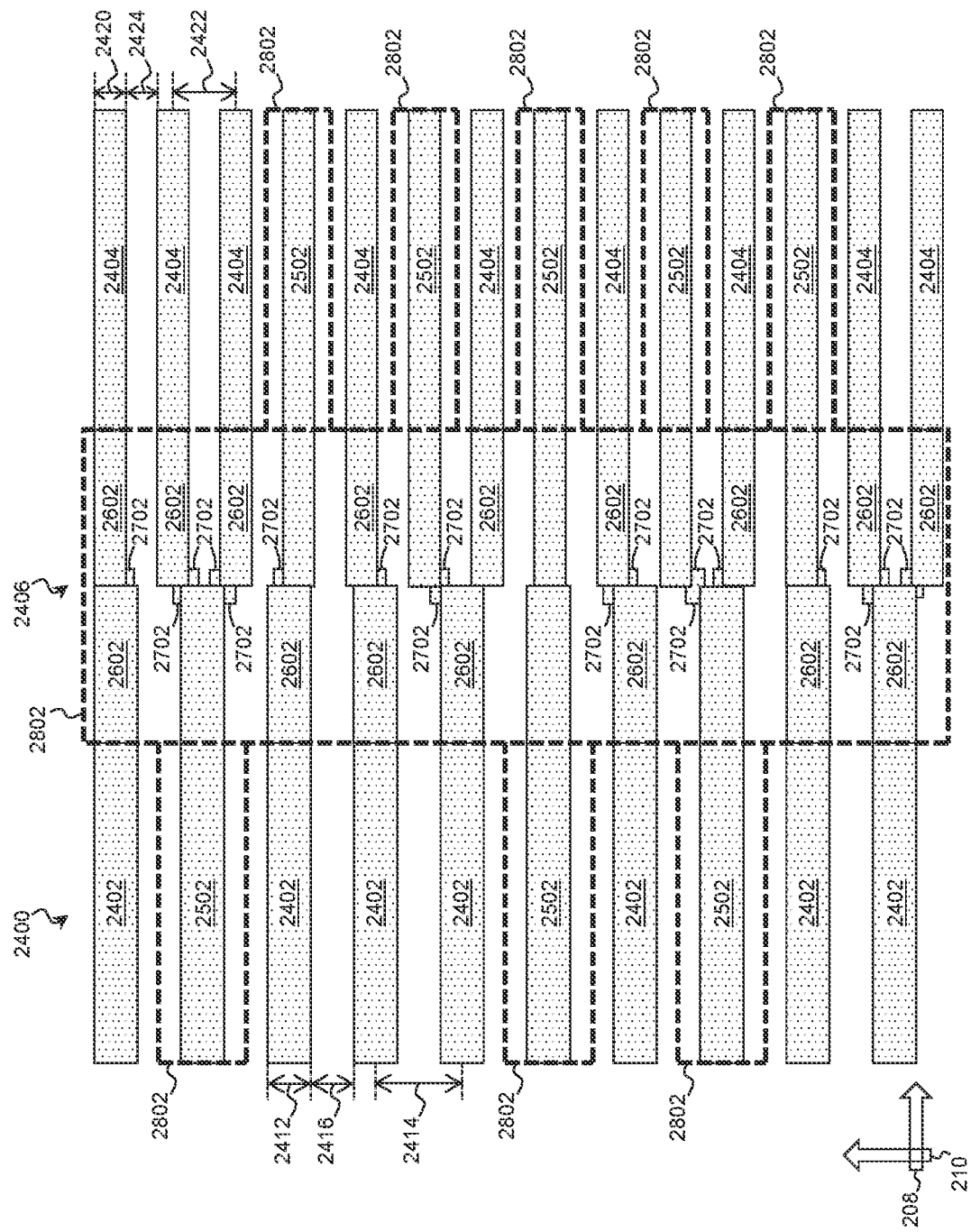

Referring to block 2310 of FIG. 23 and to FIG. 28, cut shapes 2802 are defined. This may be performed substantially as described in block 112 of FIG. 1A. The cut shapes 2802 define regions where features are to be removed, and in various examples, they cover features formed by: some or all of the fill shapes 2502 and/or some or all of the line-end extensions 2602. Individual cut shapes 2802 may be merged such that a single cut shape 2802 removes more than one of the features and/or extensions.

Referring to block 2312 of FIG. 23, the layout 2400 is provided for fabricating the masks and for fabricating the integrated circuit it specifies. As indicated by block 2314 of FIG. 23, the fabrication process may be performed substantially as described in blocks 116-146 of FIGS. 1A and 1B.

Figure 29:
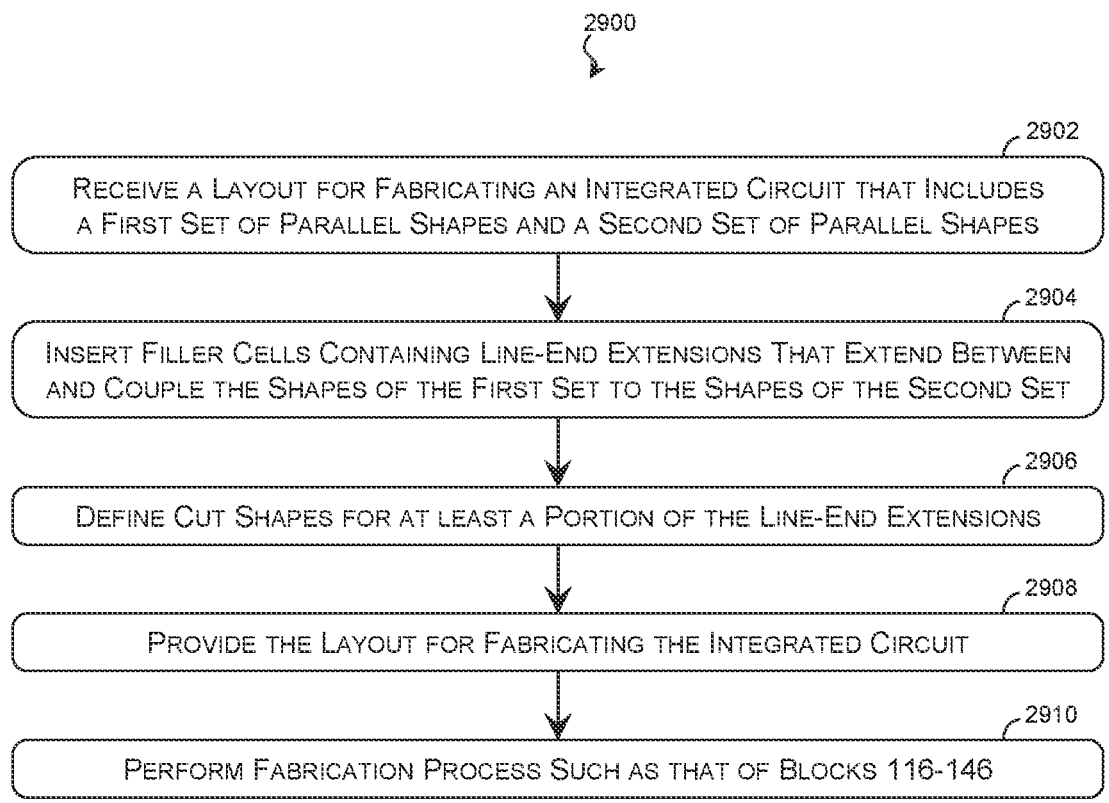
FIG. 29 is a flow diagram of a method of fabricating an integrated circuit that includes adding filler cells according to various aspects of the present disclosure.
Figure 30:
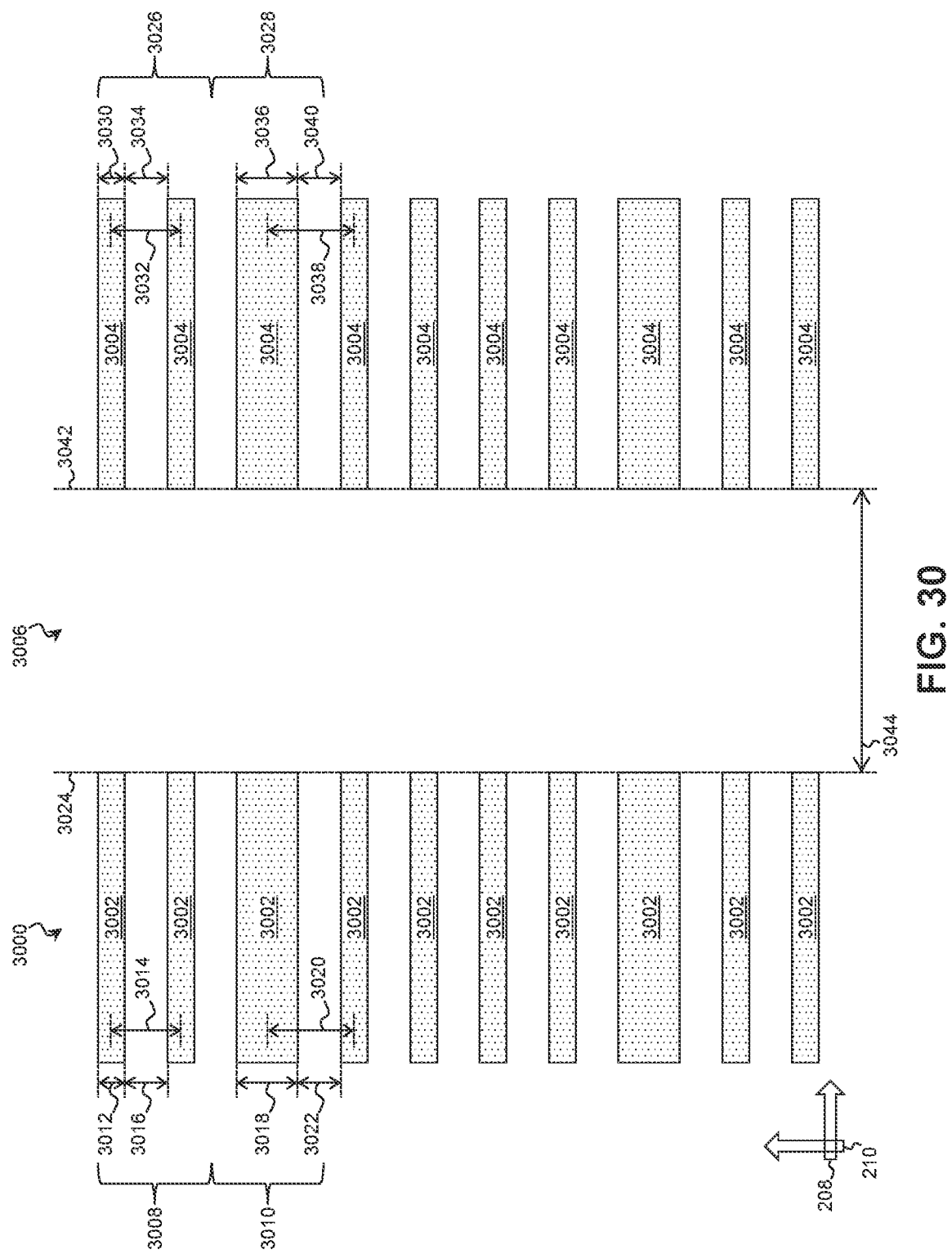
FIGS. 30-32 are top views of a portion of a layout for fabricating an integrated circuit undergoing the method of fabrication with filler cells according to various aspects of the present disclosure.
Figure 31:
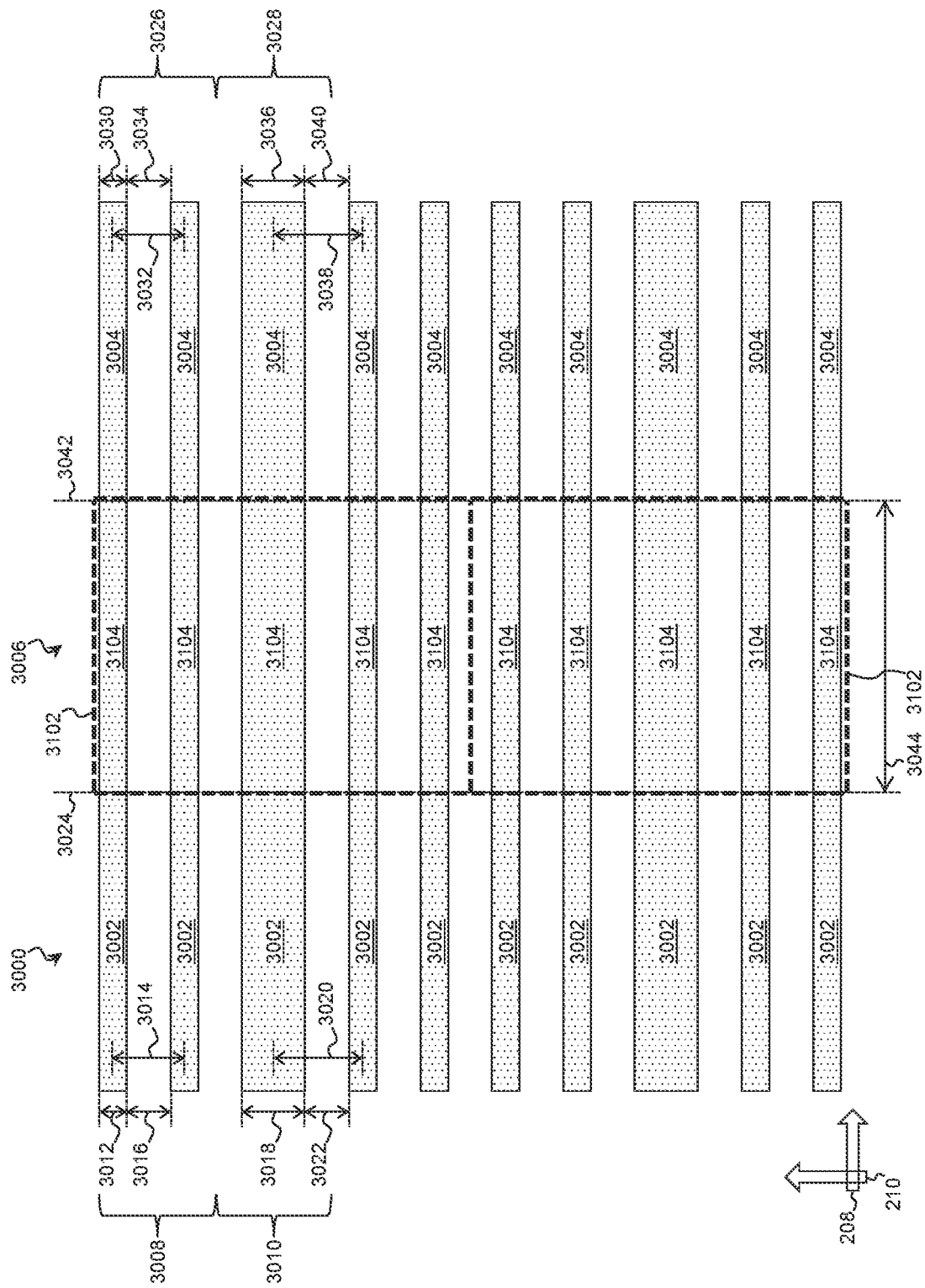
Figure 32:
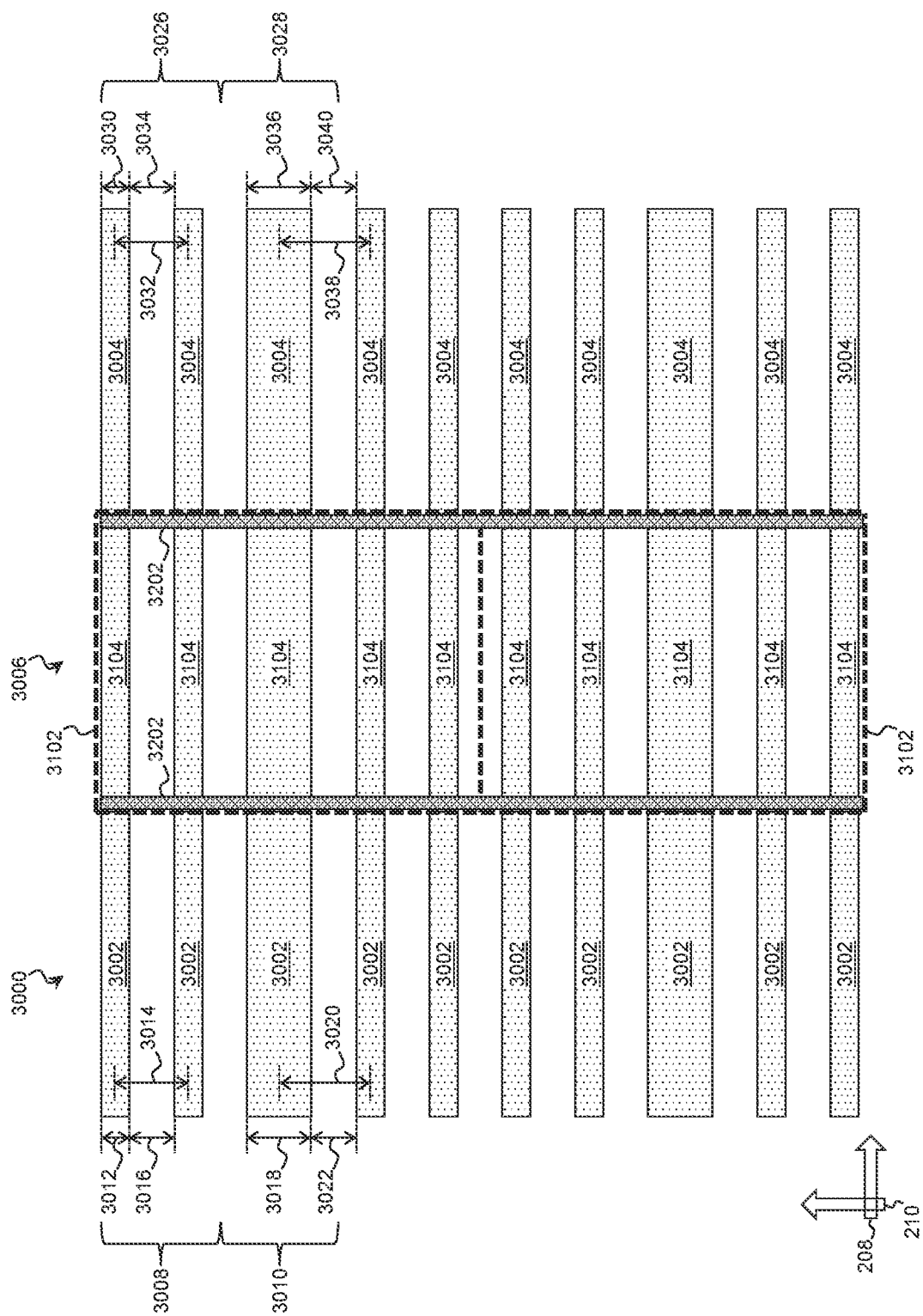
Figure 33:
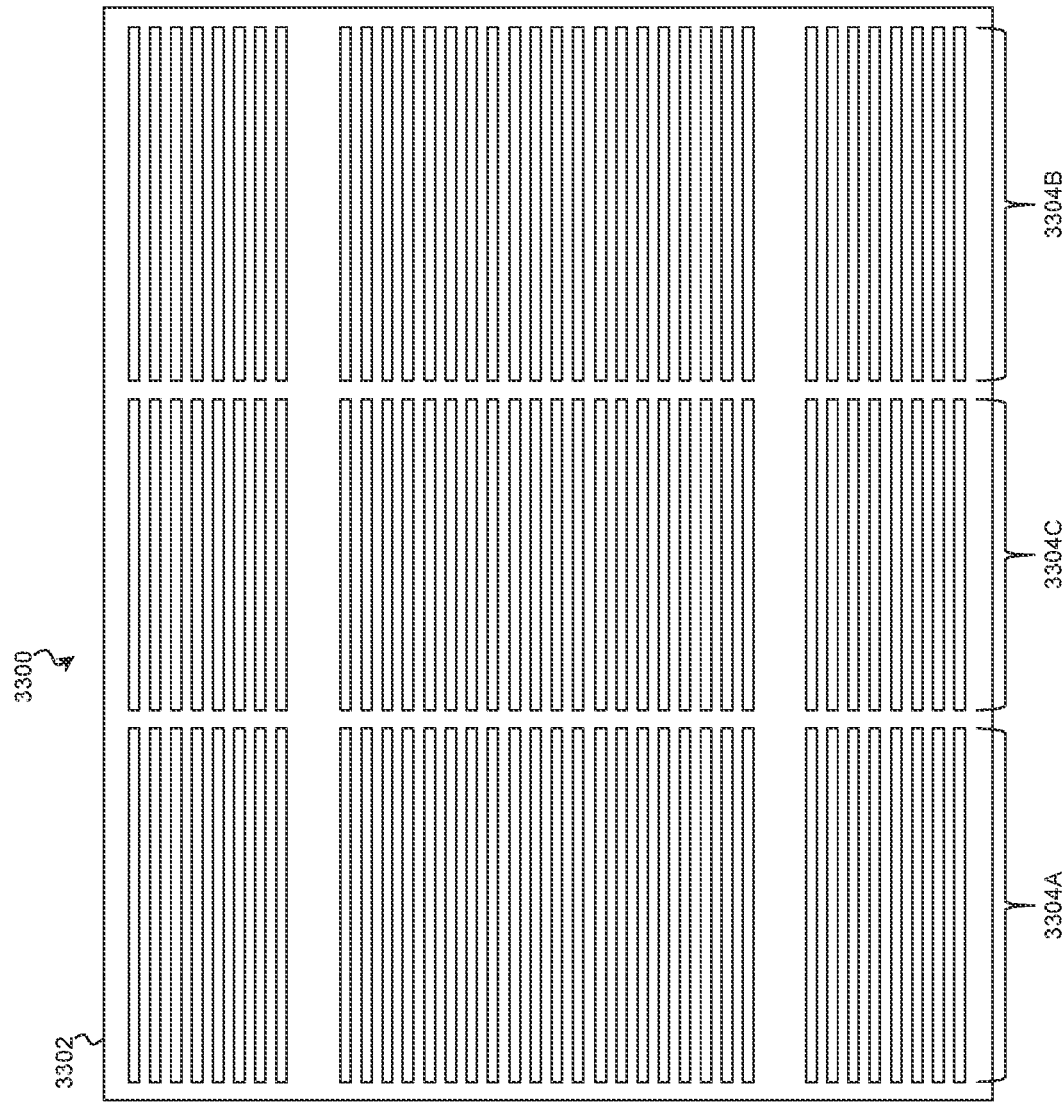
FIG. 33 is a top view of a portion of workpiece fabricated according to the layout with filler cells according to various aspects of the present disclosure.

In some examples, line-end extensions and other shapes are contained in filler cells that are added to the layout. The filler cells may be arranged such that the line-end extensions they contain couple other shapes together to avoid corresponding line-ends. Some such examples are described with reference to FIGS. 29-33. In that regard, FIG. 29 is a flow diagram of a method 2900 of fabricating an integrated circuit that includes adding filler cells according to various aspects of the present disclosure. Additional steps can be provided before, during, and after the method 2900, and some of the steps described can be replaced or eliminated for other embodiments of the method 2900. FIGS. 30-32 are top views of a portion of a layout 3000 for fabricating an integrated circuit undergoing the method 2900 of fabrication with filler cells according to various aspects of the present disclosure. FIG. 33 is a top view of a portion of workpiece 3300 fabricated according to the layout 3000 with filler cells according to various aspects of the present disclosure.

Referring first to block 2902 of FIG. 29 and to FIG. 30, a layout 3000 is received that includes a first set of shapes 3002 and a second set of shapes 3004 separated by a gap 3006. In many regards, the layout 3000 may be substantially similar to layout 200 of FIGS. 2-7 and/or layout 2400 of FIGS. 24-28. The layout 3000 may be a digital representation of an integrated circuit, and shapes 3002 and 3004 of the layout 3000 may correspond to and define physical features of a workpiece.

The layout 3000 may include any number of shapes on any number of layers. Shapes 3002 of the first set and shapes 3004 of the second set represent similar features in the same layer. Shapes 3002 extend in the first direction 208 and are substantially parallel to each other. The shapes 3002 of the first set may have any suitable width (in the second direction 210), centerline-to-centerline pitch, and minimum spacing (in the second direction 210). It is noted that the shapes 3002 of the first set may have different widths, centerline-to-centerline pitch, and/or minimum spacing. For example, shapes 3002 in a first region 3008 of the layout 3000 have a first width 3012, centerline-to-centerline pitch 3014, and minimum spacing 3016, while shapes 3002 in a second region 3010 of the layout 3000 have a second width 3018, centerline-to-centerline pitch 3020, and minimum spacing 3022 that are different from those of the shapes 3002 in the first region 3008.

Accordingly, the shapes 3002 may conform to one or more local grids that define available locations for a shape 3002. The local grid, and by extension the shapes 3002, may be considered on-grid if it conforms with a global grid of the layout 3000 or off-grid if it does not. In various examples, the shapes 3002 are off-grid in order to define and form specialized circuit devices for memory, I/O, low-frequency, low-power, high-frequency, high-power, and/or other specialized applications.

In some examples, the shapes 3002 of the first set have line ends that terminate along a common boundary 3024 in the second direction 210.

The shapes 3004 of the second set also extend in the first direction 208 and are substantially parallel to each other. The shapes 3004 of the second set may have any suitable width (in the second direction 210), centerline-to-centerline pitch, and minimum spacing (in the second direction 210), and the aspects of shapes 3004 such as width, pitch, and spacing may vary from those of shapes 3002. The shapes 3004 of the second set may have different widths, centerline-to-centerline pitch, and/or minimum spacing compared to the shapes 3002 of the first set and compared to each other. For example, shapes 3004 in a third region 3026 of the layout 3000 have a third width 3030, centerline-to-centerline pitch 3032, and minimum spacing 3034, while shapes 3004 in a fourth region 3028 of the layout 3000 have a fourth width 3036, centerline-to-centerline pitch 3038, and minimum spacing 3040 that are different from those of the shapes 3004 in the third region 3026.

As with shapes 3002, the shapes 3004 may conform to one or more local grids that define available locations for a shape 3004. In various examples, the shapes 3004 are off-grid in order to define specialized circuit devices for memory, I/O, low-frequency, low-power, high-frequency, high-power, and/or other specialized applications. In some examples, the local grid(s) of shapes 3004 align with the local grid(s) of shapes 3002, although in other examples, the local grids do not.

In some examples, the shapes 3004 of the second set have line ends that terminate along a common boundary 3042 in the second direction 210. The gap 3006 extends between the boundary 3024 of the first set and the boundary 3042 of the second set and may have any suitable width 3044 in the first direction 208. The width 3044 of the gap 3006 is described in more detail in subsequent figures.

Referring to block 2904 of FIG. 29 and to FIG. 31, filler cells 3102 that contain line-end extensions 3104 are inserted in the layout 3000. This may be performed substantially as described in block 108 of FIG. 1A and/or block 2306 of FIG. 23. The line-end extensions 3104 of the filler cells 3102 are printing features and act to lengthen the features formed by shapes 3002 and/or 3004. In some examples, the features formed by the line-end extensions 3104 are subsequently removed in a cut process, in part or in whole, leaving the features formed by shapes 3002 and 3004. One advantage to leaving at least a portion of the line-end extensions 3104 is that the corresponding features disposed on a workpiece may act to reinforce other materials such as an inter-level dielectric (ILD). In more detail, the features may be formed within an ILD, and because of differences in hardness, regions of ILD material that are not reinforced by a certain density of features may experience bumping or dishing even after a Chemical Mechanical Polishing/Planarization (CMP) process. In some examples, the remaining portions of the line-end extensions 3104 avoid these irregularities by reinforcing the ILD within the gap 3006.

The line-end extensions 3104 may couple shapes 3002 of the first set to shapes 3004 of the second set, and accordingly, the filler cells 3102 may be configured to have line-end extensions 3104 that align to the local grid(s) of shapes 3002 and shapes 3004. In some examples, the filler cells 3102 are selected from a library based on the local grids (and by extension the widths, centerline-to-centerline pitch, and/or minimum spacing) of shapes 3002 and shapes 3004. Accordingly, in one such example, shapes 3002, shapes 3004, and the line-end extensions 3104 of the filler cells 3102 each conform to the same off-grid local grid.

In some examples, because the line-end extensions 3104 of the filler cells 3102 align with the shapes 3002 and 3004 even if the shapes 3002 and 3004 are off-grid, the gap width 3044 may be reduced as padding between the shapes 3002 and 3004 and the filler cells 3102 is eliminated. Similarly, in some such examples, because the line-end extensions 3104 of the filler cells 3102 align with the shapes 3002 and 3004, the width of the filler cells 3102 and by extension the gap width 3044 may be reduced. In an example, this allowed the gap width 3044 to be reduced by more than three times compared to a reference with filler cells 3102 where the line-end extensions 3104 were strictly on-grid.

For similar reasons, the attributes that define the grid (e.g., width, pitch, spacing, etc.) of the line-end extensions 3104 (in the second direction 210) may be based on the shapes 3002 and 3004 that they extend from. Accordingly, in various examples, the line-end extensions 3104 are substantially as thick as the shapes of shapes 3002 and 3004 that they extend between and couple, are arranged at substantially the same pitch, and have substantially the same minimum spacing.

Referring to block 2906 of FIG. 29 and to FIG. 32, cut shapes 3202 are defined. This may be performed substantially as described in block 112 of FIG. 1A and/or block 2310 of FIG. 23. The cut shapes 3202 define regions where features are to be removed, and in various examples, they cover some or all of the features formed by some or all of the line-end extensions 3104. As noted above, one advantage to leaving at least a portion of the line-end extensions 3104 is that the corresponding features disposed on a workpiece may act to reinforce other materials such as an inter-level dielectric (ILD).

In some examples, the filler cells 3102 contain the respective cut shapes 3202. In some examples, the cut shapes 3202 are procedurally generated after the filler cells 3102 are inserted. The procedurally-generated cut shapes 3202 may include cut shapes 3202 where line-end extensions 3104 meet functional shapes such as shapes 3002 and 3004, while omitting cut shapes 3202 where line-end extensions 3104 meet other line-end extensions 3104 (e.g., at filler-cell-to-filler-cell boundaries). Individual cut shapes 3202 may be merged such that a single cut shape 3202 removes more than one feature of more than one line-end extension 3104 from more than one filler cell 3102. In some examples, the cut shapes 3202 have widths sufficient to remove enough of the line-end extensions 3104 features to reliably guarantee that the features of the line-end extensions 3104 are electrically isolated from the features of shapes 3002 and 3004, while leaving enough of the line-end extensions 3104 to meet a minimum feature density.

Referring to block 2908 of FIG. 29, the layout 3000 is provided for fabricating the masks and for fabricating the integrated circuit it specifies. As indicated by block 2910 of FIG. 29, the fabrication process may be performed substantially as described in blocks 116-146 of FIGS. 1A and 1B.

FIG. 33 is a top view of a portion of an example workpiece 3300 fabricated according to the layout 3000 with filler cells 3102. The workpiece 3300 includes a substrate 3302, which may be substantially similar to substrate 902 of FIGS. 9-11B and FIGS. 13A-22. The exemplary fabrication process forms a number of fins on the substrate 3302. These fins include fins 3304A, which result when a multiple-patterning process (e.g., double patterning, quadruple patterning) is performed using shapes 3002 of the layout 3000. Likewise, fins 3304B result from the multiple-patterning process performed using shapes 3004 of the layout 3000, and fins 3304C result from the multiple-patterning process performed using the portions of the line-end extensions 3104 not covered by the cut shapes 3202.

Figure 34:
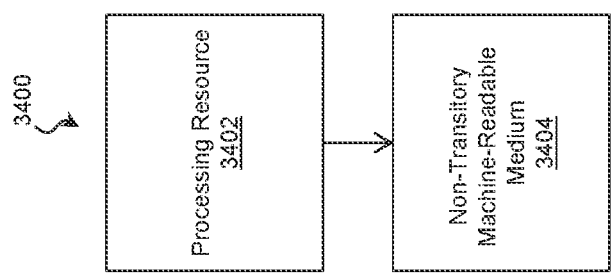
FIG. 34 is a block diagram of a computing system according to various aspects of the present disclosure.

In various embodiments, the technique is performed by using combinations of dedicated, fixed-function computing elements and programmable computing elements executing software instructions. Accordingly, it is understood that any of the steps of method 100, method 2300, and/or method 2900 may be implemented by a computing system using corresponding instructions stored on or in a non-transitory machine-readable medium accessible by the processing system. Examples of such a system and non-transitory machine-readable medium are described with reference to FIG. 34. In that regard, FIG. 34 is a block diagram of a computing system 3400 according to various aspects of the present disclosure.

The computing system 3400 includes a processing resource 3402 that, in turn, may include any number and type of processing elements such as Central Processing Units (CPUs) Graphical Processing Units (GPUs), Application-Specific Integrated Circuits (ASICs), microcontrollers, and/or other suitable processing elements. The processing resource 3402 is communicatively coupled to a tangible non-transitory machine-readable medium 3404 to execute instructions stored on the medium 3404. For the purposes of this description, the tangible non-transitory machine-readable medium 3404 can be any apparatus that can store the program for use by or in connection with the instruction execution system, apparatus, or device. The medium may include non-volatile memory including magnetic storage, solid-state storage, optical storage, cache memory, and/or battery-backed Random Access Memory (RAM).

In various examples, the tangible non-transitory machine-readable medium 3404 stores instructions that cause the processing resource 3402 to perform the processes of methods 100 and/or 2300. In some such examples, the medium 3404 stores instructions that cause the processing resource 3402 to receive a layout for fabricating an integrated circuit that includes a first set of parallel shapes and a second set of parallel shapes. This may be performed substantially as described in block 102 of FIG. 1A. In some such examples, the medium 3404 stores instructions that cause the processing resource 3402 to insert a cross-member shape in the layout between the first and second sets of parallel shapes. This may be performed substantially as described in block 104 of FIG. 1A. In some such examples, the medium 3404 stores instructions that cause the processing resource 3402 to insert fill shapes among the shapes of the first and second sets of parallel shapes. This may be performed substantially as described in block 106 of FIG. 1A. In some such examples, the medium 3404 stores instructions that cause the processing resource 3402 to insert line-end shapes extending from the shapes of the first and second sets of parallel shapes to the cross-member shape. This may be performed substantially as described in block 108 of FIG. 1A. In some such examples, the medium 3404 stores instructions that cause the processing resource 3402 to insert OPC shapes into the layout. This may be performed substantially as described in block 110 of FIG. 1A. In some such examples, the medium 3404 stores instructions that cause the processing resource 3402 to define cut shapes for the cross-member shape, the fill shapes, and/or the line-end shapes. This may be performed substantially as described in block 112 of FIG. 1A. In some such examples, the medium 3404 stores instructions that cause the processing resource 3402 to provide the layout for fabricating the integrated circuit. This may be performed substantially as described in block 114 of FIG. 1A.

In further examples, the medium 3404 stores instructions that cause the processing resource 3402 to receive a layout for fabricating an integrated circuit that includes a first set of parallel shapes and a second set of parallel shapes. This may be performed substantially as described in block 2302 of FIG. 23. In some such examples, the medium 3404 stores instructions that cause the processing resource 3402 to insert fill shapes among the shapes of the first and second sets of parallel shapes. This may be performed substantially as described in block 2304 of FIG. 23. In some such examples, the medium 3404 stores instructions that cause the processing resource 3402 to insert line-end shapes extending from the shapes of the first and second sets of parallel shapes to a centerline of a gap between the first and second sets. This may be performed substantially as described in block 2306 of FIG. 23. In some such examples, the medium 3404 stores instructions that cause the processing resource 3402 to insert OPC shapes into the layout. This may be performed substantially as described in block 2308 of FIG. 23. In some such examples, the medium 3404 stores instructions that cause the processing resource 3402 to define cut shapes for the fill shapes and/or the line-end shapes. This may be performed substantially as described in block 2310 of FIG. 23. In some such examples, the medium 3404 stores instructions that cause the processing resource 3402 to provide the layout for fabricating the integrated circuit. This may be performed substantially as described in block 2312 of FIG. 23.

In further examples, the medium 3404 stores instructions that cause the processing resource 3402 to receive a layout for fabricating an integrated circuit that includes a first set of parallel shapes and a second set of parallel shapes. This may be performed substantially as described in block 2902 of FIG. 29. In some such examples, the medium 3404 stores instructions that cause the processing resource 3402 to insert filler cells containing line-end extensions that extend between and couple the shapes of the first set to the shapes of the second set. This may be performed substantially as described in block 2904 of FIG. 29. In some such examples, the medium 3404 stores instructions that cause the processing resource 3402 to define cut shapes for at least a portion of the line-end extensions' features. This may be performed substantially as described in block 2906 of FIG. 29. In some such examples, the medium 3404 stores instructions that cause the processing resource 3402 to provide the layout for fabricating the integrated circuit. This may be performed substantially as described in block 2908 of FIG. 29.

Thus, the present disclosure provides examples of a system and technique for forming features using assist features to improve regularity, particularly at the end of feature lines. In some examples, a method includes receiving an integrated circuit layout that contains: a first set of shapes extending in parallel in a first direction for forming a first set of mandrels for etching a substrate; and a second set of shapes extending in parallel in the first direction for forming a second set of mandrels for etching the substrate, wherein a pitch of the first set of shapes is different from a pitch of the second set of shapes. A cross-member shape is inserted into the integrated circuit layout that extends across the first set of shapes and the second set of shapes in a second direction perpendicular to the first direction, and a set of line-end extensions is inserted into the integrated circuit layout that extend from each shape of the first set of shapes and the second set of shapes to the cross-member shape. The integrated circuit layout containing the first set of shapes, the second set of shapes, the cross-member shape, and the set of line-end extensions is provided for forming the first set of mandrels and the second set of mandrels and for etching the substrate based on the first and second sets of mandrels. In some such examples, a spacing of the first set of shapes is different from a spacing of the second set of shapes. In some such examples, a width of the first set of shapes is different from a width of the second set of shapes. In some such examples, the method further includes defining a set of cut shapes to remove features formed by: the cross-member and the set of line-end extensions. In some such examples, the method further includes inserting, into the integrated circuit layout, a first set of fill shapes between shapes of the first set of shapes and a second set of fill shapes between shapes of the second set of shapes. Each shape of the first set of fill shapes and the second set of fill shapes extends in parallel in the first direction, and each shape of the first set of fill shapes and the second set of fill shapes extends to the cross-member shape. In some such examples, the method further includes defining a set of cut shapes to remove features formed by: the cross-member, the set of line-end extensions, and the fill shapes. In some such examples, the method further includes performing an optical proximity correction process on the integrated circuit layout to add OPC shapes to the integrated circuit layout. In some such examples, the OPC shapes include a shape at a junction of the cross-member shape and a line-end extension of the set of line-end extensions. In some such examples, a first subset of the set of line-end extensions that extend from the first set of shapes has a width that is substantially the same as a width of the first set of shapes, and a second subset of the set of line-end extensions that extend from the second set of shapes has a width that is substantially the same as a width of the second set of shapes.

In further examples, a method includes receiving a layout for fabricating an integrated circuit, the layout containing a first set of parallel lines for forming a first set of mandrels for a multiple-patterning process that etches a substrate and a second set of parallel lines for forming a second set of mandrels for the multiple-patterning process. A cross-member is inserted into the layout between the first set of parallel lines and the second set of parallel lines. A set of line-end extensions is inserted into the layout that couple the lines of the first set of parallel lines and the second set of parallel lines to the cross-member. The layout containing the first set of parallel lines, the second set of parallel lines, the cross-member, and the set of line-end extensions is provided for performing the multiple-patterning process. In some such examples, the first set of parallel lines is different from the second set of parallel lines in at least one of: pitch, width, or spacing. In some such examples, the method further includes inserting a first set of fill lines into the layout between lines of the first set of parallel lines and a second set of fill lines into the layout between lines of the second set of parallel lines. In some such examples, each of the first set of fill lines is substantially the same as the first set of parallel lines in at least one of: a pitch, a spacing, and a width, and each of the second set of fill lines is substantially the same as the second set of parallel lines in at least one of: a pitch, a spacing, and a width. In some such examples, the method further includes inserting, into the layout, a set of cut lines to remove features formed by: the cross-member, the set of line-end extensions, the first set of fill lines, and the second set of fill lines without removing features formed by: the first set of parallel lines and the second set of parallel lines. In some such examples, the method further includes performing an optical proximity correction process on the layout to insert, into the layout, a set of optical proximity correction lines that include a line at a junction of the cross-member and a line-end extension of the set of line-end extensions. In some such examples, the set of optical proximity correction lines further includes another line at a junction of the cross-member and a fill line of the first set of fill lines.

In further examples, a method includes: receiving a layout for fabrication of an integrated circuit, wherein the layout includes: a first set of parallel shapes, a second set of parallel shapes, and a gap therebetween; inserting, into the gap, a first set of line-end extensions coupled to the first set of parallel shapes; inserting, into the gap, a second set of line-end extensions that couple the second set of parallel shapes to the first set of line-end extensions; and providing the layout for fabrication of the integrated circuit. In some such examples, the first set of parallel shapes and the second set of parallel shapes are different in at least one of: a pitch, a width, or a spacing. In some such examples, the method further includes: inserting, into the layout, a first set of fill shapes among the first set of parallel shapes and a second set of fill shapes among the second set of parallel shapes. In some such examples, the first set of fill shapes extend to the second set of fill shapes and the second set of line-end extensions; and the second set of fill shapes extend to the first set of fill shapes and the first set of line-end extensions.

In further examples, a method comprises receiving an integrated circuit layout that contains: a first set of lines extending in parallel in a first direction and a second set of lines extending in parallel in the first direction. The first set of lines includes a first line, and the second set of lines includes a second line. A pitch of the first set of lines is different from a pitch of the second set of lines. A first line-end extension is inserted into the layout that is coupled to the first line of the first set of lines. A second line-end extension is inserted into the layout that is coupled to the second line of the second set of lines and to the first line-end extension. The integrated circuit layout containing the first set of lines, the second set of lines, the first line-end extension, and the second line-end extension is provided for fabrication.

In further examples, a method comprises receiving a layout that includes a first set of parallel shapes and a second set of parallel shapes such that the first set of parallel shapes and the second set of parallel shapes are off-grid with respect to a global grid of the layout. A filler cell is inserted into the layout that contains line-end extensions that extend between and couple shapes of the first set of parallel shapes to shapes of the second set of parallel shapes. The layout containing the filler cell is provided for fabrication of an integrated circuit according to the layout. In some such examples, a cut shape is defined to remove at least a portion of a feature formed by an extension of the line-end extensions. In some such example, the portion of the feature removed by the cut shape is a first portion, and the cut shape is configured to leave a second portion of the feature formed by the extension of the line-end extensions. In some such examples, the cut shape has a width configured to electrically isolate the remaining second portion of the feature formed by the extension from a feature formed by the first set of parallel shapes. In some such examples, the filler cell is selected such that the line-end extensions are aligned with the first set of parallel shapes and the second set of parallel shapes. In some such examples, the first set of parallel shapes has a first subset and a second subset and at least one of: a pitch, a minimum spacing, or a width is different between the first subset and the second subset. In some such examples, wherein the line-end extensions of the filler cell include extensions that align with the first subset the first set of parallel shapes and extensions that align with the second subset of the first set of parallel shapes.

In yet further examples, a method includes receiving a layout for fabrication of an integrated circuit, wherein the layout includes: a first set of parallel lines, a second set of parallel lines, and a gap therebetween; inserting, into the gap, a filler cell containing a line-end extension coupling a first line of the first set of parallel lines to a second line of the second set of parallel lines; and providing the layout for fabrication of the integrated circuit. In some such examples, each of the first set of parallel lines, the second set of parallel lines, and the filler cell conform to a common local grid that is off-grid with respect to a global grid of the layout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device comprising:
    a patterned material layer that includes:
        a first set of lines extending in parallel in a first direction, wherein the first set of lines includes a first line having a first width in a second direction perpendicular to the first direction;
        a second set of lines extending in parallel in the first direction, wherein a pitch of the first set of lines is different from a pitch of the second set of lines, wherein the second set of lines includes a second line having a second width in the second direction that is different from the first width; and
        a cross-member that extends across the first set of lines and the second set of lines in the second direction such that each line from the first and second set of lines extends from the cross-member shape, wherein the cross-member has a third width in the first direction that is at least two times the pitch of the first set of lines.

2. The device of claim 1, wherein the first set of lines extend from a first side of the cross-member and the second set of lines extend from a second side of the cross-member, the second side being opposite the first side.

3. The device of claim 1, wherein the patterned material layer includes a dielectric material selected from the group consisting of semiconductor oxides, semiconductor nitrides, semiconductor oxynitrides, semiconductor carbides, and metal oxides.

4. The device of claim 1, wherein the patterned material layer includes a conductive material selected from the group consisting of metals, metal alloys and polysilicon.

5. The device of claim 1, wherein each line of the first set of lines has the first width and wherein each line of the second set of lines has the second width.

6. A device comprising:
    a set of elongated features disposed on a substrate and extending in parallel along a first axis, the set of elongated features including:
        a first elongated feature having a first elongated portion coupled to a second elongated portion, the first elongated portion having a first width in a second direction that is perpendicular to the first direction, the second portion having a second width in the second direction that is different than the first width; and
        a second elongated feature having a third elongated portion, a fourth elongated portion and fifth elongated portion, the fourth and fifth elongated portions spaced apart from each other and directly coupled to the third elongated portion, the third elongated portion having the first width in the second direction, the fourth portion having the second width in the second direction and the fifth portion having the second width in the second direction, wherein the fourth and fifth elongated portions extend the same length along the first axis.

7. The device of claim 6, wherein the first elongated portion and the third elongated portion extend the same length along the first axis.

8. The device of claim 6, wherein the set of elongated features further includes:
    a third elongated feature having a sixth elongated portion coupled to a seventh elongated portion, the sixth elongated portion having the first width in the second direction and the seventh portion having the second width in the second direction, and wherein the sixth elongated portion has a sidewall extending along the first axis that is aligned with and coupled to a sidewall of the seventh elongated portion that extends along the first axis.

9. The device of claim 6, wherein the set of elongated features further includes:
a third elongated feature having a sixth elongated portion coupled to a seventh elongated portion, the sixth elongated portion having the first width in the second direction and the seventh portion having the second width in the second direction, and
wherein the sixth elongated portion having opposing sidewalls extending along the first axis that are not aligned with opposing sidewalls of the seventh elongated portion that extend along the first axis.

10. The device of claim 6, wherein the first elongated portion maintains a substantially constant first width along the entire length of the first elongated portion,
wherein the second elongated portion maintains a substantially constant second width along the entire length of the second elongated portion,
wherein the third elongated portion maintains a substantially constant first width along the entire length of the third elongated portion,
wherein the fourth elongated portion maintains a substantially constant second width along the entire length of the fourth elongated portion, and
wherein the fifth elongated portion maintains a substantially constant second width along the entire length of the fifth elongated portion.

11. The device of claim 6, wherein the set of elongated features includes a dielectric material selected from the group consisting of semiconductor oxides, semiconductor nitrides, semiconductor oxynitrides, semiconductor carbides, and metal oxides.

12. The device of claim 6, wherein the set of elongated features includes a conductive material selected from the group consisting of metals, metal alloys and polysilicon.

13. The device of claim 6, wherein the first and third elongated portions have a first pitch and the second, fourth and fifth elongated features have a second pitch that is different than the first pitch.

14. A device comprising:
a conductive main body portion having a first length extending in a first direction and a first width extending in a second direction, the first width being greater than the first length and the second direction being perpendicular to the first direction;
a first set of conductive elongated features extending in parallel away from a first side of the conductive main body portion, wherein each of the conductive elongated features of the first set of conductive elongated features has a second width in the second direction; and
a second set of conductive elongated features extending in parallel away from a second side of the conductive main body portion, wherein each of the second set of conductive elongated features has a third width in the second direction, the third width being different than the second width and the second side of the conductive main body portion being opposite the first side, and
wherein the first length of the conductive main body portion is greater than the second width of each of the first set of conductive elongated features and the third width of each of the second set of conductive elongated features, and wherein the first length of the conductive main body portion is at least two times the pitch of the first set of conductive elongated features.

15. The device of claim 14, wherein each of the conductive elongated features from the first set of conductive elongated features extends the same distance away from the conductive main body portion.

16. The device of claim 15, wherein each of the conductive elongated features from the second set of conductive lines extends the same distance away from the conductive main body portion, and
wherein a pitch of the first set of conductive elongated features is different from a pitch of the second set of conductive elongated features.

17. The device of claim 14, wherein each of the conductive elongated features from the first set of conductive features maintains a substantially constant second width along the entire length of each conductive elongated features from the first set of the conductive features, and
wherein each of the conductive elongated features from the second set of conductive features maintains a substantially constant second width along the entire length of each conductive elongated features from the second set of conductive features.

18. The device of claim 14, wherein the conductive main body portion has an outer sidewall extending in the first direction, the outer sidewall has a first end portion and an opposing second end portion such that first end portion is aligned with and interfacing with a sidewall of a conductive elongated feature from the first set of conductive features and the second portion is aligned with and interfacing with a sidewall of a conductive elongated feature from the second set of conductive features.

19. The device of claim 14, wherein the first set of conductive elongated features includes a conductive material selected from the group consisting of metals, metal alloys and polysilicon.

20. The device of claim 14, wherein the conductive main body portion, the first set of conductive elongated features and the second set of conductive elongated features are formed of the same conductive material.

* * * * *